(12) United States Patent
Haba et al.

(10) Patent No.: US 6,568,813 B1
(45) Date of Patent: *May 27, 2003

(54) PROJECTOR HAVING AN UPPER COOLING FAN

(75) Inventors: Shinji Haba, Suwa (JP); Akitoshi Kuroda, Suwa (JP); Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/553,288

(22) Filed: Apr. 20, 2000

(30) Foreign Application Priority Data

Apr. 23, 1999 (JP) .......................... 11-116407
Jun. 25, 1999 (JP) .......................... 11-179904
Nov. 24, 1999 (JP) .......................... 11-333496

(51) Int. Cl.[7] .................. G03B 21/18; G03B 21/16; G03B 21/14; G03B 21/22
(52) U.S. Cl. .............. 353/57; 353/58; 353/60; 353/61; 353/100; 353/119
(58) Field of Search .............. 353/57, 58, 60, 353/61, 119, 100

(56) References Cited

U.S. PATENT DOCUMENTS

| 5,676,442 A | * 10/1997 | Fujimori ..................... 353/119 |
| 5,860,719 A | * 1/1999 | Suzuki et al. ................. 353/61 |
| 5,993,008 A | * 11/1999 | Hashimukai et al. ......... 353/61 |
| 6,007,205 A | * 12/1999 | Fujimori ..................... 353/57 |
| 6,040,877 A | * 3/2000 | Won ............................. 348/748 |
| 6,065,838 A | * 5/2000 | Konuma et al. .............. 353/61 |
| 6,111,630 A | * 8/2000 | Watanuki et al. ........... 349/161 |
| 6,185,052 B1 | * 2/2001 | Fujimori et al. ............. 359/819 |
| 6,254,238 B1 | * 7/2001 | Takamatsu ................... 353/61 |
| 6,280,038 B1 | * 8/2001 | Fuse et al. ..................... 353/57 |
| 6,290,360 B1 | * 9/2001 | Konuma et al. .............. 353/61 |
| 6,425,667 B1 | * 7/2002 | Haba et al. .................. 353/100 |

FOREIGN PATENT DOCUMENTS

| JP | 63-52585 | 8/1986 | ............ H04N/5/74 |
| JP | 5-53200 | 8/1991 | ........... G03B/21/16 |
| JP | A-4-54778 | 2/1992 | ............ H04N/5/74 |
| JP | 6-59238 | 8/1992 | ............. G02F/1/13 |
| JP | A-5-53200 | 3/1993 | ........... G03B/21/16 |
| JP | 8-101458 | 10/1994 | ........... G03B/21/16 |
| JP | 7-104292 | 4/1995 | ............ H04N/6/74 |
| JP | 9-130713 | 5/1997 | ......... G02F/1/1335 |

* cited by examiner

*Primary Examiner*—Russell Adams
*Assistant Examiner*—Melissa J Koval
(74) *Attorney, Agent, or Firm*—Oliff & Berridge, PLC.

(57) ABSTRACT

The invention provides an air intake on the upper plane of an exterior case which is opened upwards, and a cooling fan for introducing cooling air into the apparatus from the air intake is provided above an electro-optical device. There is no limit on the amount of air introduced, and sufficient cooling air for cooling the electro-optical device can be blown onto the electro-optical device. Accordingly, the electro-optical device can be cooled efficiently, and a cooling structure capable of dealing with high luminance of the light source lamp and reduction in size of the apparatus can be obtained.

27 Claims, 13 Drawing Sheets

PROJECTOR HAVING AN UPPER COOLING FAN

BACKGROUND OF THE INVENTION

1. Field of Invention

The present invention relates to a projector including an electro-optical device for forming optical images according to image information.

2. Description of Related Art

There are conventionally-known projectors including a light source, a electro-optical device for forming optical images of light flux emitted from the light source according to image information, a projecting lens for performing enlarged projection of the image formed with this electro-optical device, and an external case for storing these components.

Such projectors are widely used for multimedia presentations at conferences, academic meetings, exhibitions, etc., and reduction in size is being promoted since the projectors may be brought in a necessary or moved to another location for storage after usage.

Also, high luminance of light source lamps serving as the light source is being promoted, in order to make the projected images from the projector clear.

With such projectors having high luminance and reduced size, the temperature within the device tends to rise, so there is the need to efficiently cool the electro-optical device which is weak to heat.

Accordingly, an air intake is formed at the lower plane of the exterior case, and a cooling fan for introducing external air as cooling air from the air intake is provided below the electro-optical device, thereby cooling the electro-optical device.

However, with the above conventional projector, there is the need to have the center of gravity at a low position in order to secure stability at the time of being set up, so the height-wise dimensions from the desktop, or the like, on which the projector is set to the lower plane of the exterior case is made to be small. Accordingly, even in the event that introduction of great amounts of cooling air from the lower plane of the projector using the cooling fan is attempted, there is a limit to the amount of air which can be introduced through the gap portion, and particularly, with projectors having high luminance and reduced size, there is the problem that cooling of the electro-optical device cannot be performed sufficiently.

SUMMARY OF THE INVENTION

The present invention provides a projector that includes a cooling structure which effectively cools the electro-optical device and which can deal with high luminance of light source lamps and reduction in size of the apparatuses. The projector may include an electro-optical device for forming optical images according to image information and an exterior case for covering a main unit containing the electro-optical device, wherein an air intake opening for intake of external air as cooling air is formed at the upper plane of the exterior case, and a cooling fan for introducing the cooling air from the air intake opening and cooling the electro-optical device is provided above the electro-optical device.

According to the present invention, the upper plane of the exterior case is usually opened upwards, so an air intake is provided on this upper plane, and a cooling fan for introducing cooling air from this air intake to the inside of the apparatus is provided above the electro-optical device, whereby cooling air sufficient for cooling the electro-optical device can be easily blown onto the electro-optical device. Thus, the electro-optical device can be cooled efficiently, and a cooling structure capable of dealing with high luminance of light source lamps and reduction in size of the apparatuses can be obtained.

In the above, it is preferable for the projector to have a projecting lens for enlarged projection of images formed by the electro-optical device, and the projecting lens to have a plurality of lenses positioned following a predetermined axis, with the lens of the plurality of lenses positioned at the base edge closest to the projecting direction at least notched at the upper edge side thereof.

The electro-optical device may be provided near the base edge of the projection lens, so arranging for the center of the image forming area of the electro-optical device to be positioned lower than the intersection of an extended line from the axis of the projection lens and the electro-optical device causes the optical image from the electro-optical device to be cast in from the lower side of the axis, and to be projected by passing through the projecting lens and expanding above the axis. Accordingly, even in the event that the upper edge side of the lens positioned at the side closest to the base edge is notched, there is no problem, and an optical image is enlarged and projected into a projecting plane.

Accordingly, with the upper edge of the lens in a notched form, the cooling fan provided above the electro-optical device can be positioned closer to the electro-optical device by an degree equivalent to the degree of the notching of the upper edge. Thus, cooling air with great force can be introduced to the electro-optical device, so cooling of the electro-optical device can be performed even more efficiently. Also, positioning the cooling fan closer to the electro-optical device reduces the height-wise dimensions of the projector, so the projector can be made smaller and thinner.

Also, a light shielding structure for preventing light from leaking from the air intake opening is preferably provided above the cooling fan.

Thus, light can be prevented from leaking from the air intake, thus improving the visual recognition of the image by observers which generally observe the image from behind the apparatus.

Further, the light shielding structure is preferably formed in a louver-like configuration wherein a plurality of plate-shaped members positioned in a parallel manner across the air intake opening so as to assume a predetermined angle with the planes thereof as to the opening plane of the air intake opening. Specifically, inclining the plate-shaped members so as to descend toward the rear side of the apparatus or inclining so as to descend toward the front side of the apparatus changes the direction of the gaps between the plate-shaped members, so the direction of emission of leaking light can be restricted. Now, inclining the plate-shaped members so as to descend toward the rear side of the apparatus causes leaking light to be emitted forwards from the apparatus, so leaking light is not cast into the eyes of the observers, and the visual recognition of the image by observers observing the image from behind or beside the apparatus can be further improved. That is, with an arrangement wherein the multiple plate-shaped members assume a predetermined angle with the planes thereof as to the opening plane of the air intake opening, there is hardly any light leaking out. Moreover, cooling air can be introduced to the cooling fan from the gaps between the plate-shaped members. Accordingly, employing a louver-like configuration of plurality of plate-shaped members as the light shielding structure allows prevention of leaking light and introduction of cooling air to be performed with a single light-shielding structure, so there is no increase in the number of parts for the projector, and the projector can be reduced in size from this perspective, as well.

Also, an exhaust opening for exhausting air within the projector externally is preferably provided to the front plane of the exterior case.

Thus, the air taken inside the apparatus with the cooling fan can be exhausted forward from the apparatus, so the exhausted air does not blow on observers observing the image from behind or beside the apparatus, so the observers do not feel discomfort from this perspective as well.

Also, the exhaust is formed at the front plane of the exterior case, so light leaking from the exhaust is not recognized by observers observing the image from behind or beside the apparatus, so visual recognition of the image by the observers can be improved. Incidentally, providing the exhaust with a light-shielding structure for preventing leaking of light from the exhaust can prevent light from leaking from the exhaust.

Further, the aforementioned projector preferably includes a projecting lens for enlarged projection of the image formed with the electro-optical device, and an optical parts housing for storing optical parts, wherein the projecting lens and the optical parts housing are combined and positioned in a planar U-shape having a recession portion, the recession portion faces the front side of the exterior case, an electric power source unit for supplying electric power to driving circuit boards, and the like, for driving the electro-optical device is positioned at the recession portion, and a device fan for exhausting air which has been taken in with the cooling fan and has cooled the internal parts of the projector outside of the projector and a electric power source fan for independently exhausting air which has been heated by the electric power source unit are provided at the exhaust.

Now, the electric power source unit for providing electricity to the driving circuit board, and the like, heats up, but the surrounding area thereof is surrounded by the optical parts housing and the projecting lens, so there is nowhere for the heat to escape. Accordingly, providing an exhaust and an exhaust fan dedicated to the electric power source unit allows the air heated by the electric power source unit to be aggressively exhausted. Thus, the rise in temperature of the electric power source unit can be suppressed, and stabilizing of the electric power source unit can be easily realized.

Also, preferably, a temperature detecting device for detecting the temperature of the cooling air near the electric power source unit is provided near the electric power source unit, and the electric power source fan is independently controlled by the temperature detected by the temperature detecting device.

Now, the temperature detecting device is preferably configured so as to output detecting signals to the control board for controlling the electric power source fan. Configuring the temperature detecting device such allows control wherein, e.g., in the event that detecting is made that the temperature of the electric power source unit is high, the number of revolutions of the electric power source fan is increased so as to rapidly cool the electric power source unit, and conversely in the event that detecting is made that the temperature of the electric power source unit is low, the number of revolutions of the electric power source fan is lowered so as to gradually cool the electric power source unit.

Incidentally, the reference temperature serving as a reference for high and low for the detected temperature should be determined as appropriate based on results obtained by experimentation, and the like.

Thus, rapid rises in temperature due to providing electric power to the driving circuit board, and the like, can be prevented, and prevention of heating of the electric power source unit can be easily realized.

Also, a preferable arrangement has a lamp driving circuit board for driving the lamp at the side of the U-shaped main unit placed in a planar U-shaped form by combining the projecting lens and the optical parts housing, wherein the lamp driving circuit board has a cooling air intake channel for introducing cooling air taken in by the cooling fan and is covered by a protective cover member and formed between the projecting lens and the optical parts housing, wherein an exhaust channel for leading the cooling air which has been introduced from the cooling air intake channel and which has cooled the electro-optical device to the device fan is formed between the lower plane of the optical parts housing and the inner lower plane of the exterior case, and wherein an opening for introducing a part of the cooling air flowing through the exhaust channel is formed to the protective cover member.

Thus, the inside of the protective cover member can be cooled as well, so cooling within the projector can be performed even more efficiently.

Also, intake and exhaust channels are formed, so circulation of air is conducted in an efficient manner, and the cooling efficiency of the electro-optical device improves even further. Further, the cooling air intake channel and exhaust channel are thus formed, so the structure within the projector can be simplified, and causing the cooling air to flow at the bottom of the optical parts housing allows the optical parts positioned within the housing, such as the lenses, mirrors, etc., to also be easily cooled.

Also, the projector preferably is arranged such that the electro-optical device has a plurality of light modulation devices, a prism for synthesizing light modulated by the plurality of light modulation devices, and an optical parts housing which stores optical parts other than the projecting lenses, the light modulation devices, and the prism, and is formed so as to envelop the light incidence plane of the light modulating device, wherein a rectifying plate for introducing cooling air from the cooling fan to the light modulating devices is provided at the gap between the optical parts housing and the prism.

Thus, cooling air from the cooling fan can be guided to the light modulating devices with the rectifying plate, so circulation of the air flowing through the gap between the optical parts housing and the prism is conducted in an efficient manner, and the cooling efficiency of the light modulating devices improves even further.

Further, the rectifying plate is preferably attached to the optical parts housing.

Thus, simply attaching the optical parts housing to the exterior case is sufficient, and there is no need to provide in the apparatus a separate structure for supporting the rectifying plate, thus enabling simplifying of the structure. Accordingly, ease of the task of attaching the rectifying plate is facilitated, further facilitating ease of the task of assembling the projector.

Also, preferably, the optical parts housing has a fan attachment portion for fixing the cooling fan, and the rectifying plate is attached between the fan attachment portion and the cooling fan.

Thus, the rectifying plate is positioned directly below the cooling fan, so the cooled air introduced within the apparatus from the cooling fan can be guided and blown on the light modulating devices. Thus, the cooling efficiency of the light modulating device improves even further.

Further, the rectifying plate preferably has an attaching piece which is attached to the fan attachment portion, and an extending piece which extends from the edge portion of the attaching piece toward the light modulating devices, wherein the tip of the extending piece is positioned lower than the cooling fan side edge of the image forming area of the light modulating devices.

The image forming area relates to the area at the center of the modulating device used for forming images. Light is concentrated at this area, and particularly easily overheats. Also, in the event that a material which easily changes modulation properties by heat, such as liquid crystal is used, temperature rising in the image forming area may cause deterioration in the image quality.

Accordingly, positioning the tip of the extending piece of the rectifying plate lower than the cooling fan side edge of the image forming area enables cooling air to be blown against the extended piece and thus, directly blown onto the image forming area, and consequently, such problems can be reduced.

Further, in the event of forming the electro-optical device from three light modulating devices which perform modulation of red, green, and blue light fluxes, blue light has greater energy than the other color lights, and the image forming area of the modulating device which performs modulation of this light easily overheats, so placing the rectifying plate near the light modulating device which performs modulation of the blue light flux enables rapid temperature rising of the light modulating device to be suppressed. Accordingly, the cooling efficiency of the electro-optical device can be improved even further.

DETAILED DESCRIPTION OF PREFERRED EMBODIMENTS

A. First Embodiment

The first embodiment according to the present invention will be described below based on the drawings.

(1) Overall Structure of the Apparatus

Figure 1:
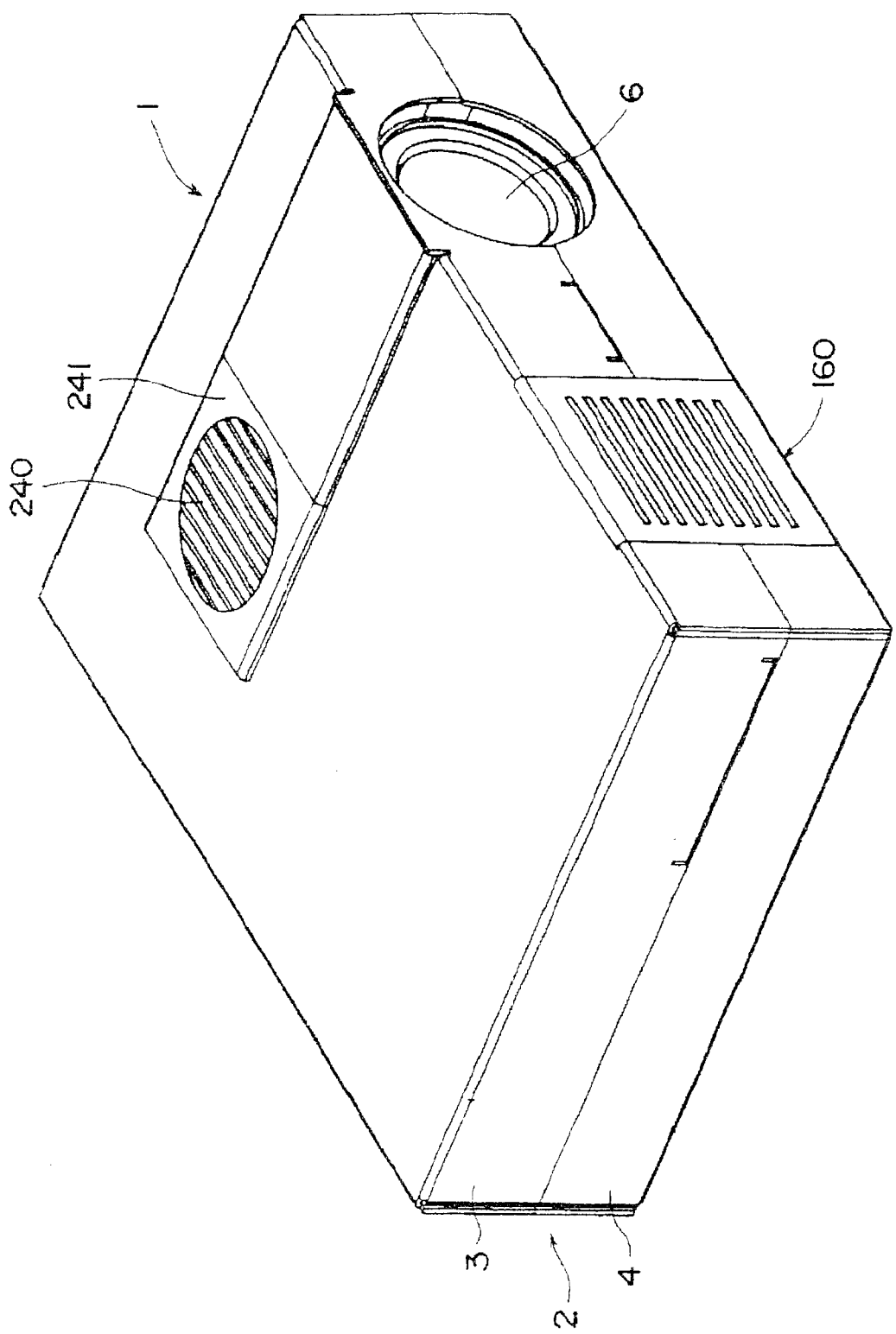
FIG. 1 is an external perspective view illustrating a projector according to a first embodiment of the present invention.

FIG. 1 illustrates a schematic perspective view of a projector 1 according to the present embodiment.

The projector 1 is for splitting the light flux emitted from the light source lamp serving as the light source into the three primary colors of red (R), green (G), and blue (B), modulating these color light fluxes according to image information through liquid crystal panels making up the electro-optical device, synthesizing the post-modulation modulated light fluxes of each color with a prism (color synthesizing optical system), and performing enlarged display on a projection screen via a projecting lens 6. Each component is stored within the exterior case 2 serving as a housing.

(2) Structure of the Exterior Case

The exterior case 2 is basically includes an upper case 3 covering the upper plane of the apparatus, a lower case 4 including the bottom plane of the apparatus, and a rear case covering the rear portion of the apparatus, wherein the upper case 3 and lower case 4 are formed of die-cast magnesium, and the rear case is formed of resin.

At the generally center-right side on the upper plane of the upper case 3 (the right side as viewed from the front) is an air intake 240, and this air intake 240 is provided to a filter exchanging lid 241 formed of resin and covering the opening. At the inside of the filter exchanging lid 241 is provided an air filter (omitted in drawing). The internal air filter can be replaced by detaching this filter exchanging lid 241 from the upper plane side of the upper case 3.

An exhaust duct 160 is formed at the front of the upper case 3 and lower case 4, as a ventilation opening for exhausting the air within the apparatus.

At the side and rear sides toward the air intake 240 of the exterior case 2 formed thus, there are arrayed an unshown AC inlet for supplying external electrical power, and various input/output terminals groups.

(3) Internal Structure of the Apparatus

Figure 2:
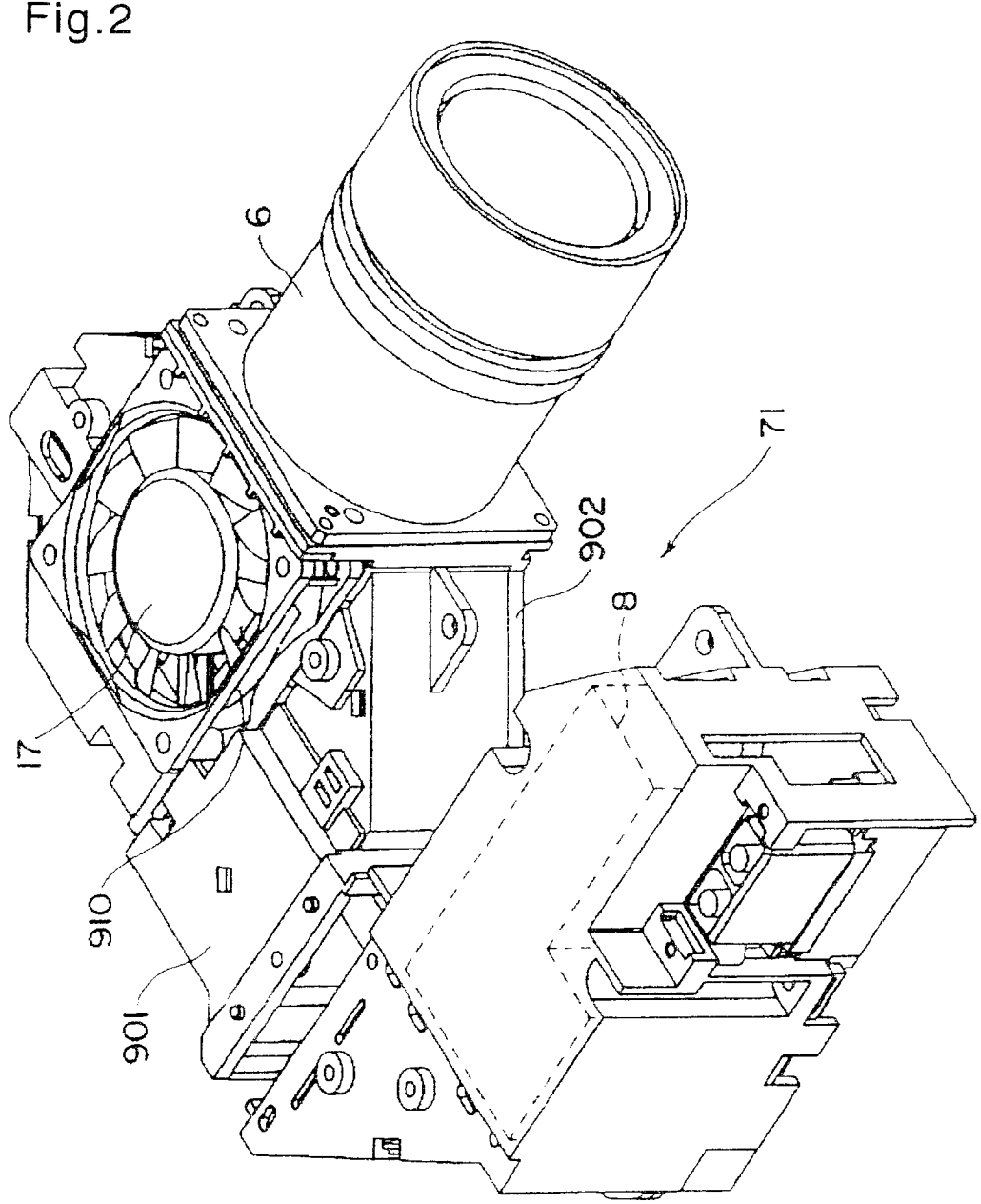
FIG. 2 is a perspective view illustrating the interior structure of the projector in the aforementioned embodiment.
Figure 4:
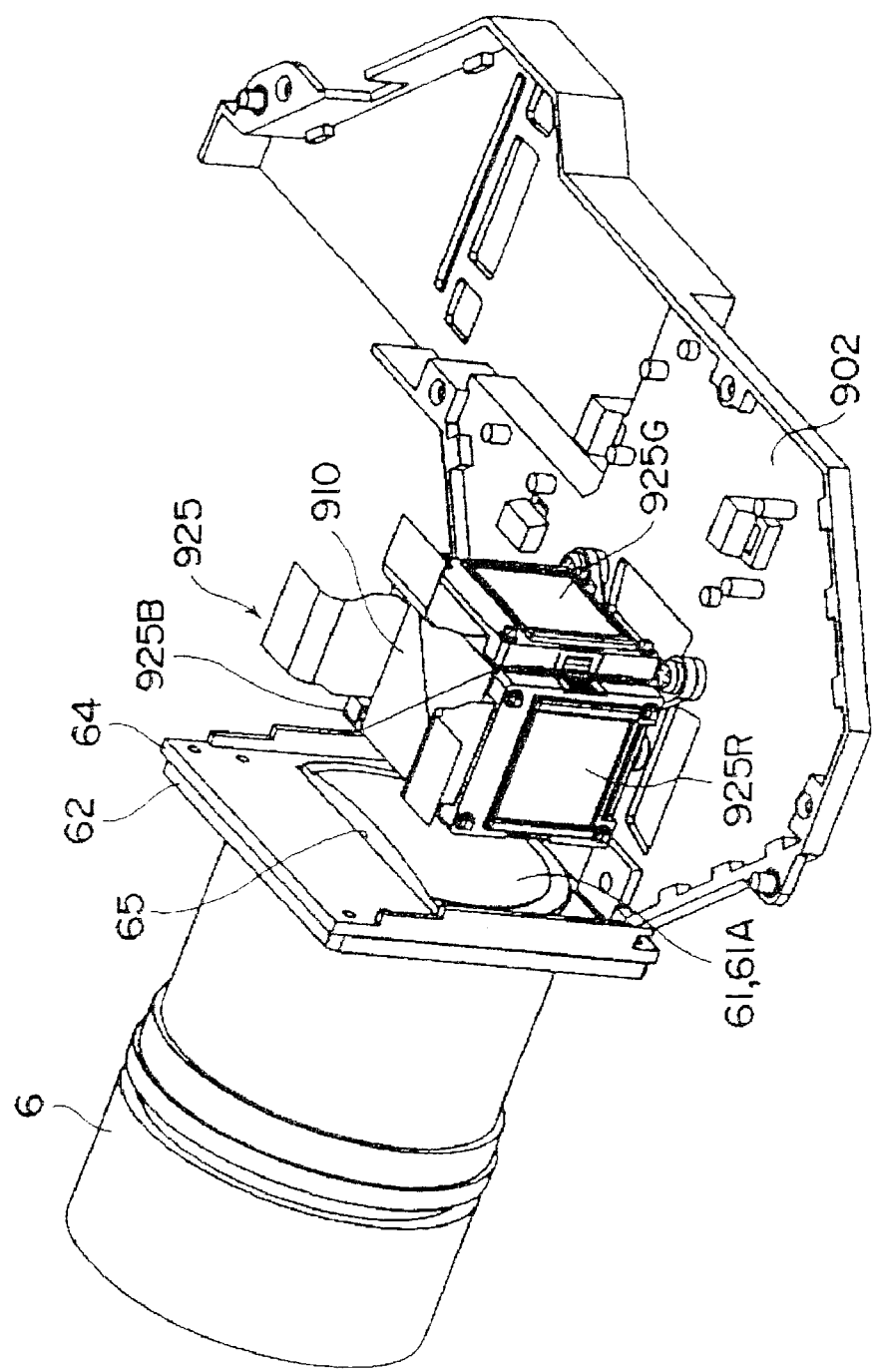
FIG. 4 is a perspective view illustrating the interior structure of the projector in the aforementioned embodiment.

FIG. 2 and FIG. 4 shown the internal structure of the projector 1.

As shown in these drawings, the inside of the apparatus 1 is provided with a light source lamp unit 8 provided across an interval from one side of the projecting lens 6, an optical unit 10 making up the optical system placed between the projecting lens 6 and the light source lamp unit 8, a driver board (omitted in drawing) for driving the electro-optical device 925 within the optical unit 10, a main board (omitted in drawing) for controlling the entire apparatus 1, and also is provided with a electric power source unit (omitted in drawing) for transforming electricity from the AC inlet and supplying to the cooling fan 17 which is positioned above the light source lamp unit 8, driver board, main board, and electro-optical device 925, an exhaust fan (omitted in drawing) positioned in front of the light source lamp unit 8, and so forth. Incidentally, this electric power source unit, may be configured having been divided into a plurality upon consideration of displacement space within the apparatus 1.

Figure 5:
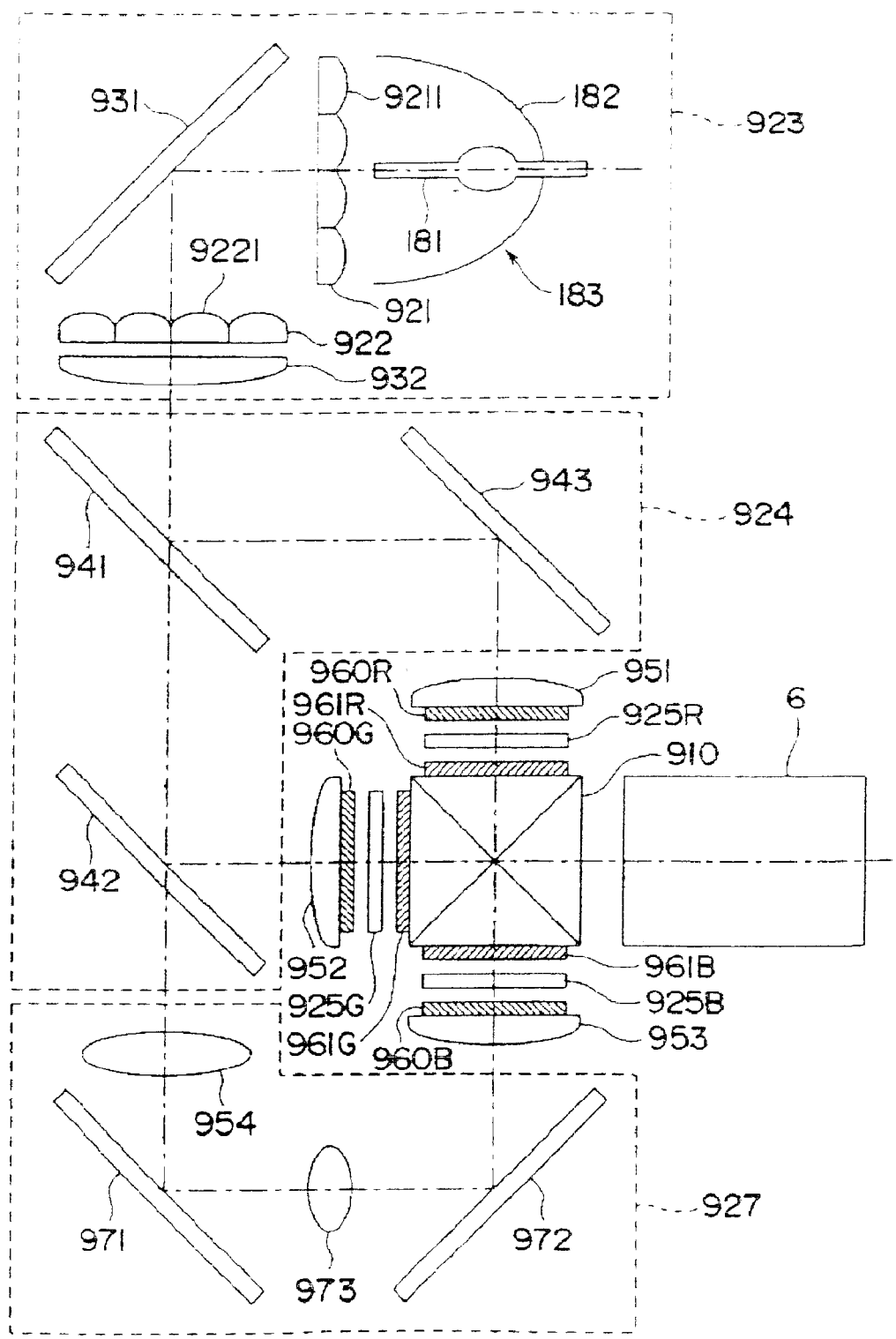
FIG. 5 is a model diagram for describing the structure of the optical system in the aforementioned embodiment.

The light source lamp unit 8 makes up the light source potion of the projector 1, and as shown in FIG. 5, has a light source 183 including a light source lamp 181 and a concave mirror 182, and a lamp housing (omitted in drawing) for storing this light source 183. Such a light source lamp unit 8 is cooled by cooling air from the aforementioned cooling fan 17 and cooling air sucked in from the gap between the exterior case 2 and the projecting lens 6. The cooling air first cools the electro-optical device 925, and the like, immediately after being drawn in, then flows to the left side so as to cool generally the entire area within the apparatus 1, and finally the major portion thereof passes through the light source lamp unit 8 and is exhausted by the exhaust duct 160 by the exhaust fan (omitted in drawing). Accordingly, the light source lamp unit 8 is positioned immediately before the exhaust fan, so the light source 183 within can be efficiently cooled with great amounts of cooling air.

Figure 3:
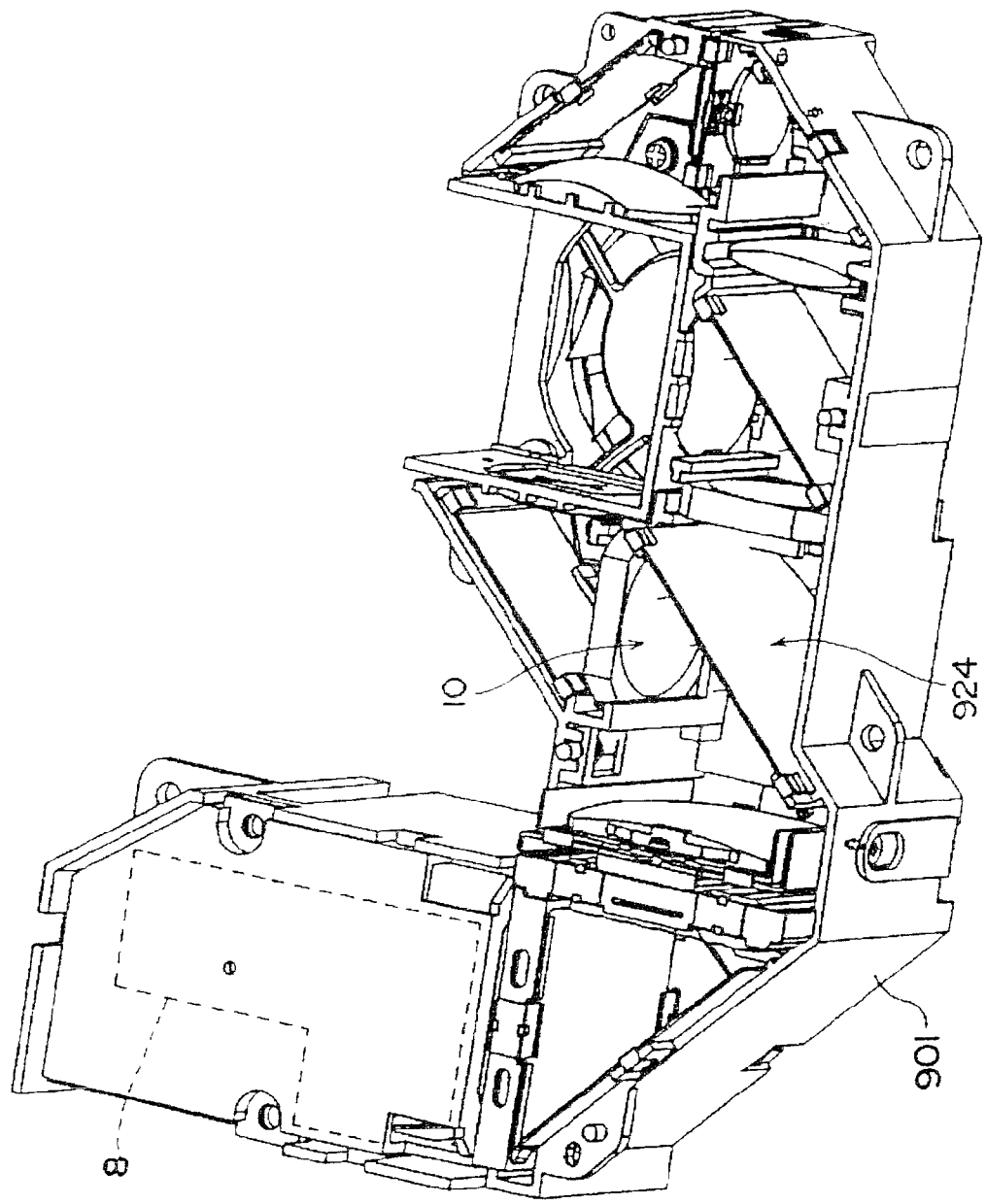
FIG. 3 is a perspective view illustrating the interior structure of the projector in the aforementioned embodiment.

The optical unit 10 is a unit for optically processing light fluxes emitted from the light source lamp unit 8 and forming an optical image corresponding to image information, and is configured including an illumination optical system 923, a color light splitting optical system 924, an electro-optical device 925, and a cross-dichroic prism 910 serving as a color light synthesizing optical system. The optical elements of the optical unit 10 other than the electro-optical device 925 and the cross-dichroic prism 910 are in a configuration of having been vertically pinched and held between the top and bottom light guides 901 and 902. Incidentally, the upper light guide 901 and bottom light guide 902 are formed integrally, and are fixed to the side of the lower case 4 by a fixing screw. Here, FIG. 3 is a diagram wherein the top light guide 901 has been removed from the lower light guide 902 and inverted to reveal the interior thereof.

The rectangular cross-dichroic prism 910 is fixed to the upper plane side of the lower light guide 902 by a fixing screw, as shown in FIG. 4. Also, the liquid crystal panels 925R, 925G, and 925B making up the electro-optical device 925 are fixed to the three sides of the cross-dichroic prism 910 via fixing members.

Further, though omitted in the drawings, a driver board for driving and controlling the liquid crystal panels 925R, 925G, and 925B of the electro-optical device 925 is positioned above the optical unit 10, and a main board upon which are formed control circuits for controlling the entire projector 1 is erected behind the optical unit 10. Accordingly, the main board and driver board are mutually positioned at right angles and electrically connected. Also, an AV board whereupon the aforementioned input terminal groups are provided is erected and positioned in the same manner as with the main board, and is electrically connected to this main board.

The projecting lens 6 is provided with a flange 62 at the base edge thereof toward the projecting direction of the projecting lens 6. This flange 62 is formed as a rectangular form protruding from the perimeter of the projecting lens 6 toward the outer side of the diameter direction, and is fixed to a square head plate 64 erected at the edge of the lower light guide 902. Thus, the projecting lens 6 is attached to the lower light guide 902.

(4) Structure of the Optical System

Next, the optical system of the projector 1, i.e., the structure of the optical unit 10 will be described based on the model diagram shown in FIG. 5.

As described above, the optical unit 10 includes an illumination optical system 923, a color light splitting optical system 924 including dichroic mirrors 941 and 942 and a reflecting mirror 943, a relay optical system 927 including reflecting mirrors 971 and 972 and an incident side lens 954 and a relay lens 973, three field lenses 951, 952, 953, three liquid crystal panels 925R, 925G, and 925B, a cross-dichroic prism 910, and a projecting lens 6. Respectively provided at the light incidence side plane of the liquid crystal panels 925R, 925G, and 925B are incident side polarizing plates 960B, 960G, and 960R. Also, respectively provided at the light emitting side are emitting side polarizing plates 961B, 961G, and 961R.

The illumination optical system 923 includes a light source 183 which emits generally parallel light fluxes, a first lens array 921 a second lens array 922, a superimposing lens 932 and a reflecting mirror 931. The illumination optical system 923 is an integrator illumination optical system for illuminating the image forming areas of the three liquid crystal panels 925R, 925G, and 925B in an approximately uniform manner.

The light source 183 has a light source lamp 181 serving as a radiative light source for emitting light rays in a radiative manner, and a concave mirror 182 for emitting the radiative light emitted from the light source lamp 181 as generally parallel light fluxes. Halogen lamps, metal halide lamps, high-pressure mercury vapor lamps are often used for the light source lamp 181. A parabolic mirror or an ellipse mirror are preferably used for the concave mirror 182.

The first lens array 921 has a configuration of a matrix array of small lenses 9211 having a generally rectangular outline being arrayed in M rows and N columns. The small lenses 9211 split the parallel light flux cast in from the light source into multiple (M by N) partial light fluxes, with each light flux being focused near the second lens array 922. The form of the outline of the small lenses 9211 is set to be approximately similar to the form of the image forming area of the liquid crystal panels 925R, 925G, and 925B. For example, in the event that the aspect ratio (ratio of horizontal and vertical dimensions) of the image forming area of the liquid crystal panels is 4:3, the aspect ratio of the small lenses would also be set to 4:3.

The second lens array 922 also has a configuration of a matrix array of small lenses 9211 having a generally rectangular outline being arrayed in M rows and N columns, so as to correspond to the small lenses 9211 of the first lens array 921. The second lens array 922 functions so that the center axes (main rays) of the partial light fluxes emitted from the first lens array 921 are cast into the incident plane of the superimposing lens 932 in a perpendicular manner. Further, the superimposing lens 932 functions to superimpose the partial light fluxes upon the three liquid crystal panels 925R, 925G, and 925B. Also, the field lenses 951, 952, and 953 function to convert the partial light fluxes irradiated upon the liquid crystal panels 925R, 925G, and 925B into light fluxes parallel to the center axes (main rays) thereof. Incidentally, as shown in FIG. 5, the second lens array 922 is positioned at a 90 degree inclination to the first lens array 921 across from the reflecting mirror 931. The reflecting mirror 931 is provided to guide the light flux emitted from the first lens array 921 to the second lens array 922. Depending on the configuration of the illumination optical system, this may not be necessary. For example, in the event that the first lens array 921 and the light source are provided parallel to the second lens array 922, this is not necessary.

In the optical unit 10 shown in FIG. 5, the generally parallel light flux emitted from the light source 183 is divided into multiple partial light fluxes by the first and second lens arrays 921 and 922 making up the integrator optical system. The partial light fluxes emitted from the small lenses 9211 of the first lens array 921 are generally superimposed on the image forming area of the liquid crystal panels 925R, 925G, and 925B, by the superimposing lens 932. Consequently, the liquid crystal panels 925R, 925G, and 925B are illuminated by a generally uniform illuminating light for the plane distribution.

The color light splitting optical system 924 has two dichroic mirrors 941 and 942 and a reflecting mirror 943, and functions to split the light cast from the superimposing lens 932 into color light of the three colors red, green, and blue. The first dichroic mirror 941 reflects the red light component of the light flux emitted from the illumination optical system 923, and transmits the blue light components and the green light components. The red light reflected by the first dichroic mirror 941 is reflected by the reflecting mirror 943, passes through the field lens 951, and reaches the liquid crystal panel 925R for the red color. This field lens 951 converts the partial light fluxes emitted from the second lens array 922 into light fluxes parallel to the center axes (main rays) thereof. The field lenses 952 and 953 provided in front of the other liquid crystal panels 925G and 925B operate in the same manner.

Of the blue light and green light transmitted through the first dichroic mirror 941, the green light is reflected by the second dichroic mirror 942, passes through the field lens 952, and reaches the liquid crystal panel 925G for the green color. On the other hand, the blue light is transmitted through the second dichroic mirror 942, passes through a relay optical system 927 including an incident side lens 954, a relay lens 973, and a reflecting mirror 972, and further passes through the field lens 953 and reaches the liquid crystal panel 925B for the blue color. The reason that the relay optical system 927 is used for the blue light is in order to prevent deterioration of usage effectiveness of the light due to dispersion, and the like, of light, since the length of the optical path of the blue light is longer than the optical light of the other color lights. That is, in order to transmit the partial light fluxes cast into the incident side lens 954 to the field lens 953 without change.

An incident side polarizing plate 960R and an emitting side polarizing plate 961R are provided respectively to the light incident/emitting plane sides of the liquid crystal panel 925R. The incident side polarizing plate 960R only transmits specific polarized light out of the incident light. The liquid crystal panel 925R performs modulation of the red polarized light emitted from the incident side polarizing plate 960R, based on provided image information. The emitting side polarizing plate 961R only transmits specific polarized light out of the modulated light emitted from the liquid crystal panel 925R.

Incident side polarizing plates 960G and 960B, and emitting side polarizing plates 961G and 961B, are also provided respectively to the light incident/emitting plane sides of the liquid crystal panels 925G and 925B. Incidentally, polysilicone TFTs used as switching devices for example can be employed as the liquid crystal panels 925R, 925G, and 925B according to the present embodiment.

The cross-dichroic prism 910 functions as a color light synthesizing system for synthesizing the three color lights and forming a color image. The cross-dichroic prism 910 has a dielectric multi-layer film which reflects red light, and a dielectric multi-layer film which reflects blue light, formed in a generally X-shaped form following the interfaces of four right-angle prisms. The three color lights are synthesized by these dielectric multi-layer films.

The light configured by the cross-dichroic prism 910 is emitted toward the projecting lens 6. The projecting lens 6 functions to project this synthesized light on a projecting plane, such as a projecting screen, or the like, and displaying a color image.

(5) Structure of the Projecting Lens

Figure 6:
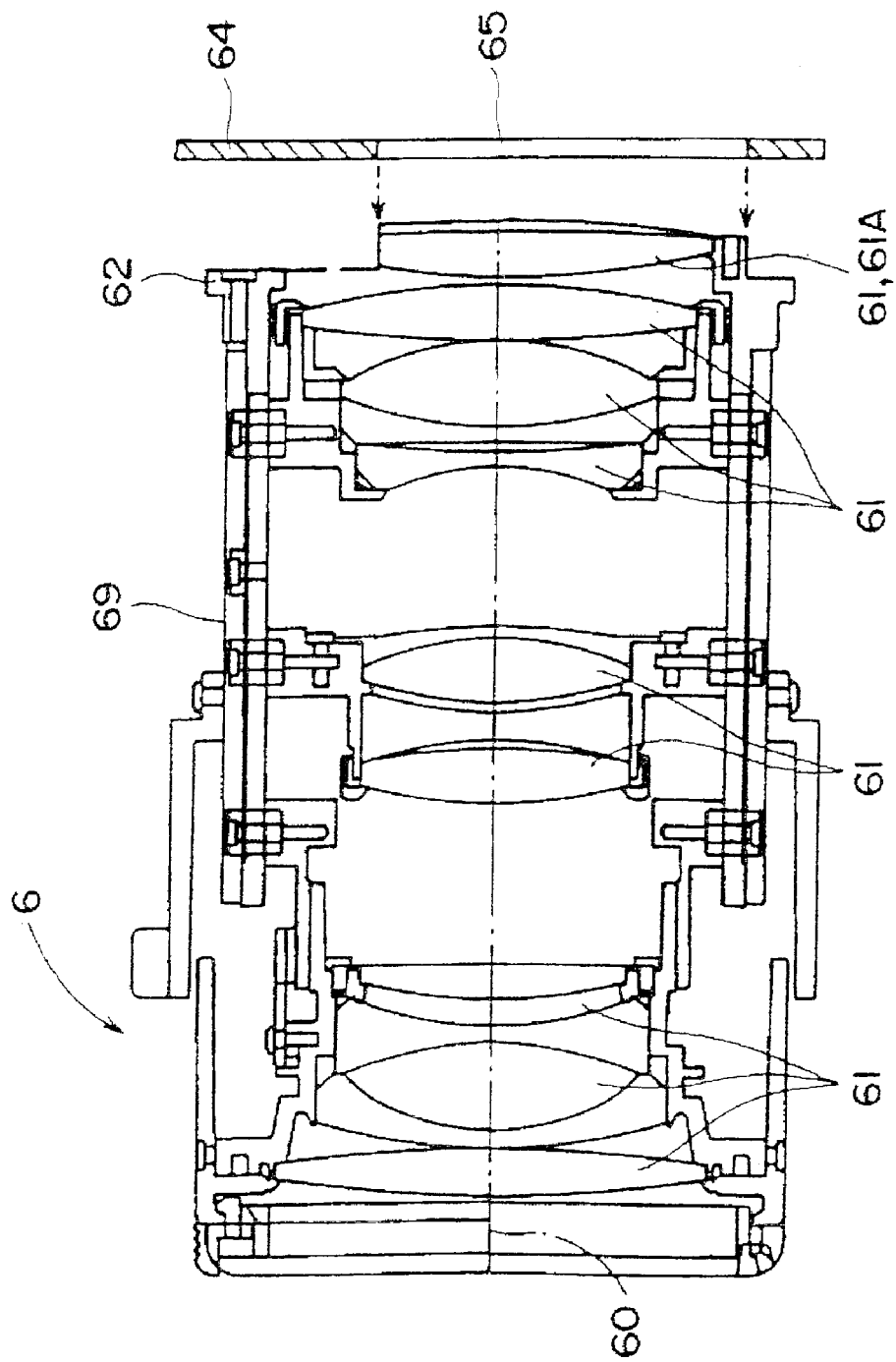
FIG. 6 is a cross-sectional view of a projecting lens in the aforementioned embodiment.

The projecting lens 6 is for enlarging and projecting the input optical image, and as shown in FIG. 6, is provided with multiple lenses 61 arrayed following a predetermined axis. The multiple lenses 61 are fixed within a cylinder 69 including multiple members. Also, formed near the base edge side of the projecting lens 6 in the projection direction thereof is a rectangular flange 62 protruding from the perimeter of the cylinder 69 toward the outer side of the diameter direction. This flange 62 is formed closer to the tip side of the projecting lens 6 than the base plane thereof.

Figure 7:
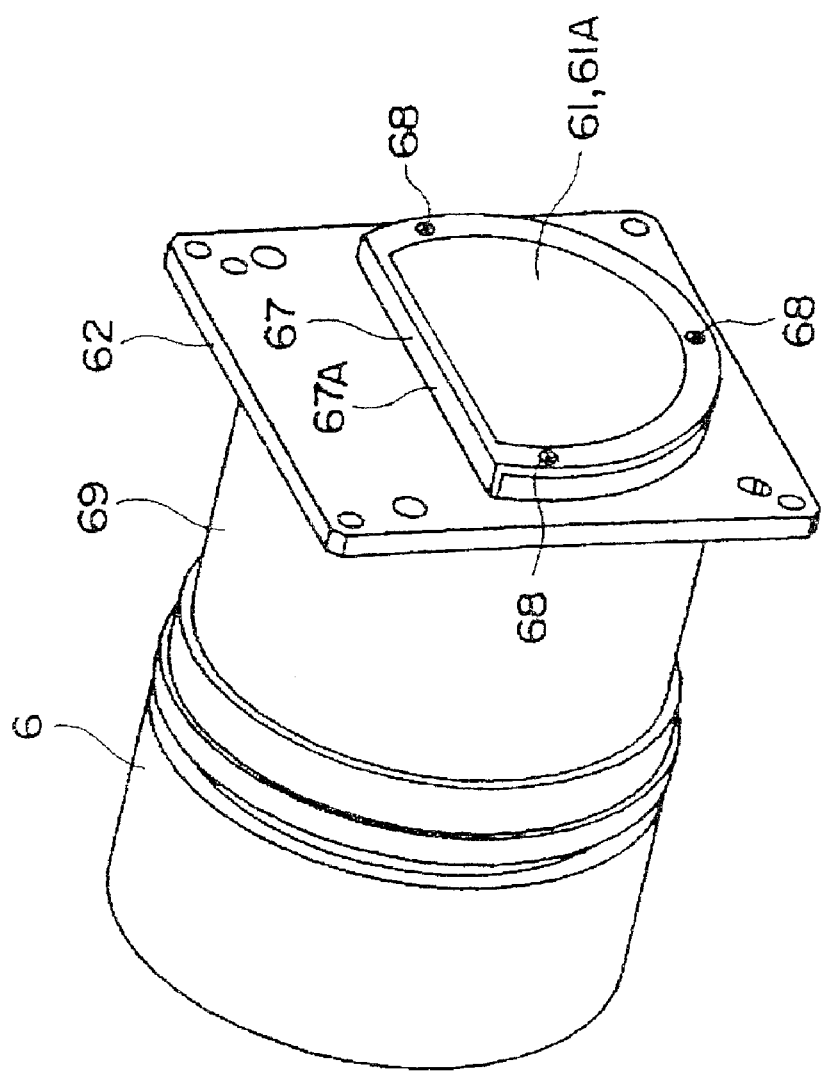
FIG. 7 is a perspective view of a projecting lens in the aforementioned embodiment.

As shown in FIG. 7, of the multiple lenses 61, the lens 61A positioned closest to the base edge side as to the direction of projection is formed with the upper edge thereof notched. Also, the upper edge side of the cylinder 69 also has a notched form, to match the form of the lens 61A. Of the sides of the lens 61A, portions other than the notched portion are covered by the cylinder 69. Further, of the sides of the lens 61A, the notched portion is covered with a plane 67 having light-shielding properties, so as to prevent dust from intruding into the projecting lens 6 and light from leaking. The plane 67 has a frame portion 67A following the circumference of the lens surface of the lens 61A, and this frame portion 67A is fixed to the cylinder 69 by three screws 68. Incidentally, the number of lenses 61A with the upper edge side thereof notched is set according to the position of the flange 62 formed on the projecting lens 6.

Also, as described above, the projecting lens 6 is fixed to the lower light guide 902 via a head plate 64 serving as a supporting member for supporting the base edge side. This head plate 64 is formed in a rectangle with an outline somewhat larger than the outline of the flange 62. An opening 65 is formed to this head plate 64 according to the perimeter form of the lens 61A, and the lens 61A is inserted into this opening 65 (FIG. 4).

Now, the projecting lens according to the present embodiment has the upper edge side of the lens 61A at the base edge side notched, so unlike the case of a normal round lens 61, the area of the opening 65 can be reduced. Accordingly, the height-wise dimensions of the head plate 64 can be reduced. Further, the percentage of area of the opening 65 as to the area of the head plate 64 can be reduced, so the head plate 64 can be made thinner.

Figure 8:
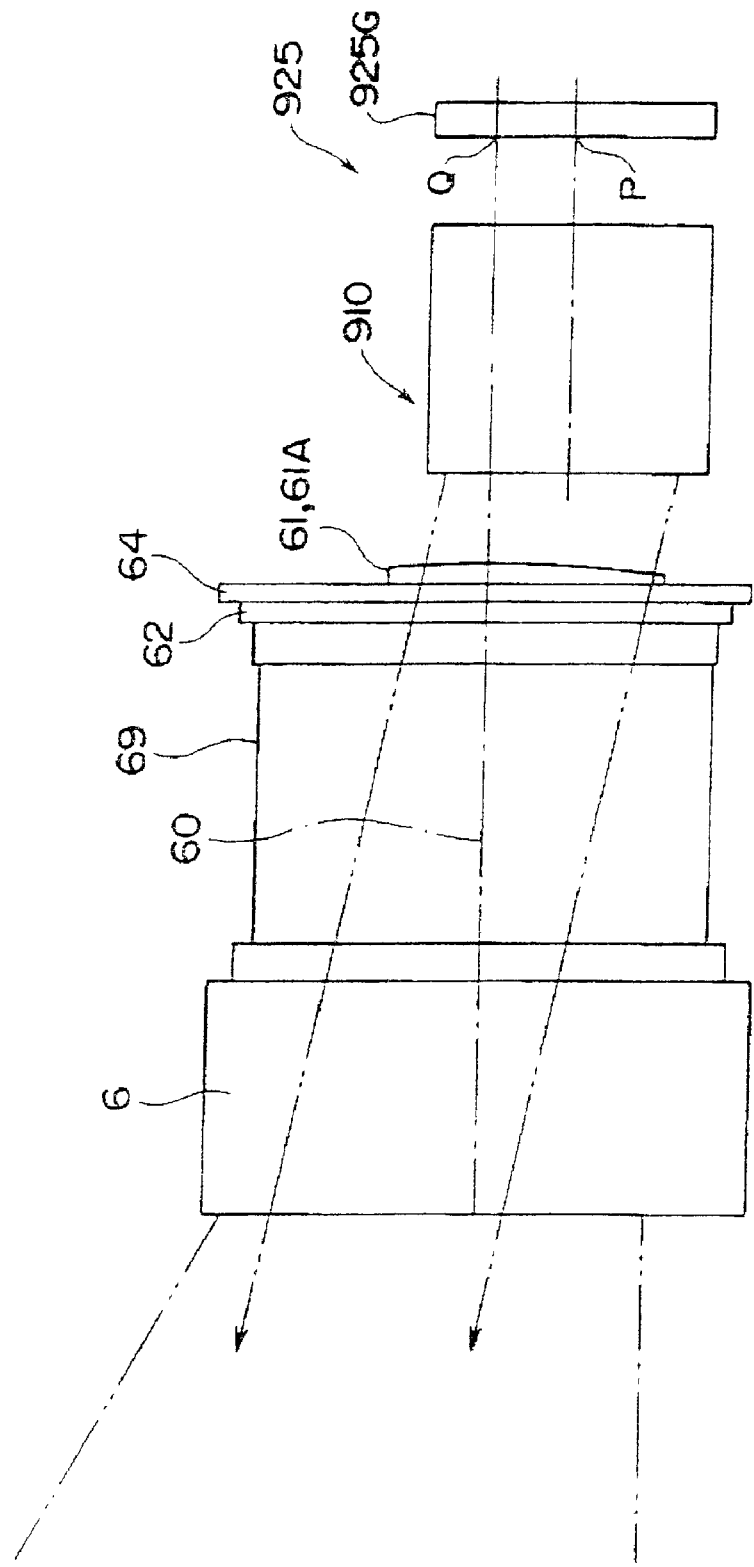
FIG. 8 is a diagram illustrating an optical image in the aforementioned embodiment.

Incidentally, the center P of the image forming area of the liquid crystal panels 925R, 925G, and 925B serving as the light modulating devices making up the electro-optical device 925 is positioned lower than the intersection Q between an extended line from the axis 60 of the projecting lens 6 and the liquid crystal panels 925R, 925G, and 925B, as shown in FIG. 8. Accordingly, an optical image from the liquid crystal panels 925R, 925G, and 925B passes through the cross-dichroic prism 910 and is cast into the projecting lens 6 from the lower side of the axis 60, and is projected so as to expand above the axis 60 through the projecting lens 6. Accordingly, even in the event that the upper edge side of the lens 61A positioned at the side closest to the base edge in the projection direction is notched, there is no problem, and the image can be enlarged and projected into the projecting plane.

(6) Cooling Structure of the Electro-optical Device

Figure 9:
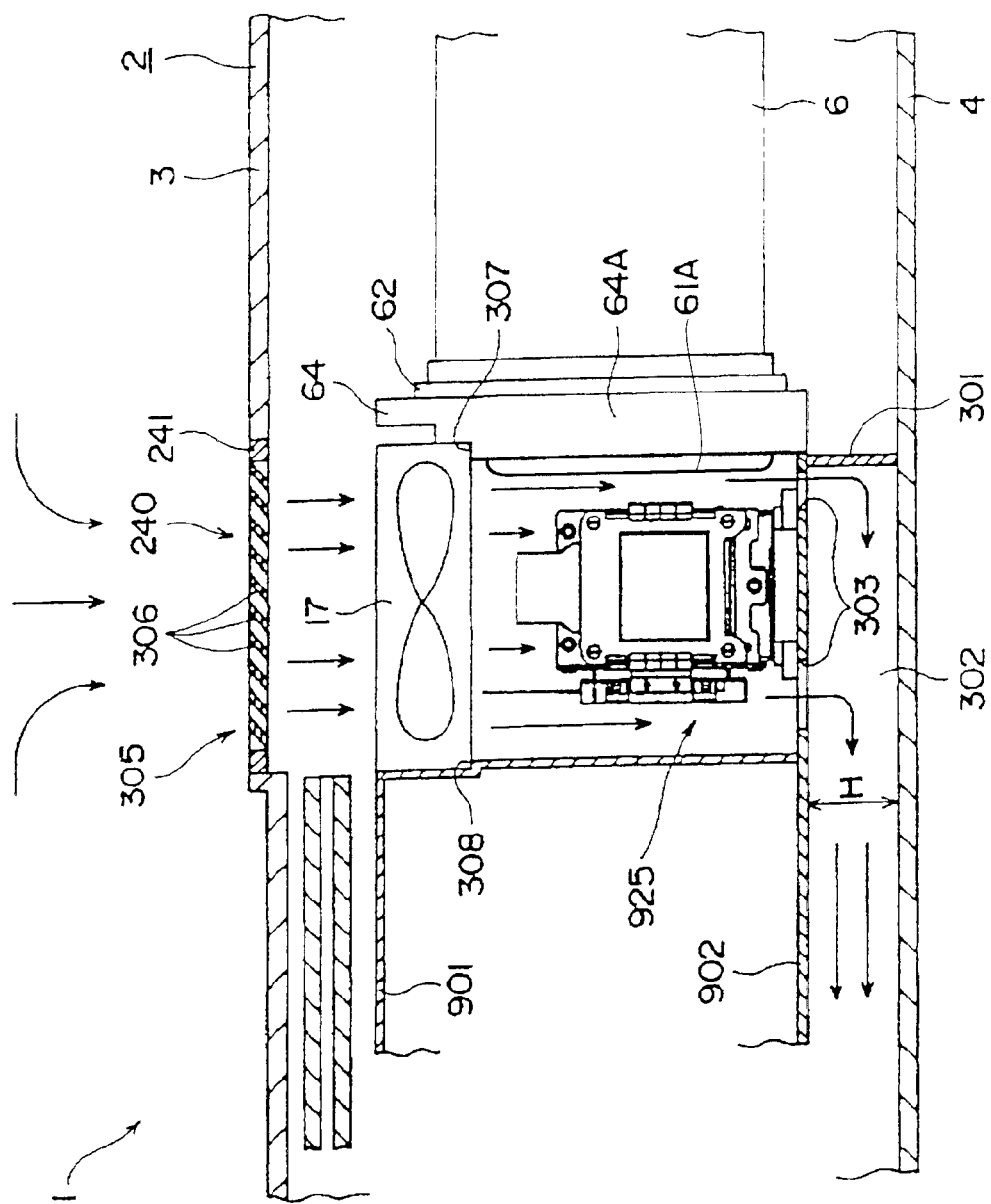
FIG. 9 is a cross-section of the projector in the aforementioned embodiment.

FIG. 9 shows the cooling structure of the electro-optical device 925 in the above-described projector 1. Provided above the electro-optical device 925 is a cooling fan 17 (thickness dimensions of, e.g., around 10 to 15 mm) for introducing outside air from the air intake 240 as cooling air and cooling the electro-optical device 925. The air intake 240 provided above the cooling fan 17 is provided at the top, so there is no limit in the amount of air which can be introduced. Accordingly, sufficient cooling air can be blown on the electro-optical device 925 by the cooling fan 17.

The upper edge side of the lens 61A positioned closest to the base edge side as to the direction of projection is formed notched, so this cooling fan 17 can be positioned closer to the electro-optical device 925 by the amount of notching. On the other hand, a stepped portion 307 is provided to a pair of vertical walls 64A formed approximately perpendicularly to the projection lens 6 attaching plane of the head plate 64, and a stepped portion 308 is provided to the plane of the top light guide 901 facing the liquid crystal panels 925R, 925G, and 925B. The cooling fan 17 is supported by this stepped portion 307 and stepped portion 308, and is fixed by screws. The height-wise position of the stepped portion 307 and stepped portion 308 is arranged such that the upper edge of the cooling fan 17 does not protrude from the upper edge of the head plate 64 even in the event that the cooling fan 17 is provided above the electro-optical device 925.

The lower light guide 902 to which the electro-optical device 925 is positioned rests on a guide member 301 protruding on the upper plane of the lower case 4. Thus, a gap 302 having height-wise dimensions H of approximately 8 mm for example is formed between the upper panel of the lower case 4 and the lower plane of the lower light guide 902. Also, holes 303 communicating with the gap 302 are formed to the lower light guide 902 in the perimeter of the electro-optical device 925. Thus, the cooling air introduced with the cooling fan 17 flows as shown by the arrows in FIG. 9 such that always fresh cooling air is blown onto the electro-optical device 925, and subsequently, the air flows through the gap 302 and through the inside of the apparatus 1, thus enabling effective cooling of the electric power source unit and the light source lamp unit 8 situated within the apparatus 1.

The above air intake 240 is formed as a light shielding structure 305 in order to prevent light from leaking from the air intake 240 to outside of the apparatus. This light shielding structure 305 is formed in a louver-like configuration wherein a plurality of plate-shaped members 306 are positioned in a parallel manner across the air intake 240. Each of the plate-shaped members 306 are positioned inclining downwards toward the rear side of the apparatus 1. Thus, the inside cannot be easily seen from the outside, i.e., hardly any light leaks out. Now, even in the event that light did leak out, that leaking light would be emitted forwards of the apparatus 1 from the gaps between the plate-shaped members 306, i.e., the emitting direction of the leaking light is restricted, so the leaking light is not cast into the eyes of observers sitting behind the apparatus. Accordingly, the air intake 240 functions dually, functioning to prevent leaking light, and functioning to introduce the cooling air.

Next, description will be made regarding the cooling procedures for the electro-optical device 925.

First, rotation of the cooling fan 17 forcibly takes cooling air from the air intake 240 into the apparatus 1. The cooling air that has been taken in flows as shown by the arrows in FIG. 9, and is blown on the electro-optical device 925. The air which has been blown thereupon passes through the holes 303 and gap 302, flows along the lower case 4, cools the light source lamp unit 8 and electric power source unit within the apparatus 1, and is discharged out of the apparatus 1 by the exhaust fan.

(7) Advantages of the First Embodiment

According to the present embodiment as described above, there are the following advantages.

That is, an air intake 240 is provided on the upper plane of the exterior case 2 of which the top is opened, and a cooling fan 17 for introducing cooling air from the air intake 240 into the apparatus 1 is provided above the electro-optical device 925, so there is no limit in the amount of air which can be introduced, and sufficient cooling air for cooling the electro-optical device 925 can be easily blown onto the electro-optical device 925. Thus, the electro-optical device 925 can be easily cooled, and a cooling structure capable of dealing with high luminance of the light source lamp 181 and reduction in size of the apparatus 1, etc., can be obtained.

Also, the upper edge side of the lens positioned closest to the base edge side as to the direction of projection is notched so as to be generally flat to form a lens 61A, and the cooling fan 17 provided above the electro-optical device 925 can be positioned closer to the electro-optical device 925 by an amount equivalent to the amount of notching at the upper edge side, so cooling air with great force can be introduced to the electro-optical device 925, and cooling of the electro-optical device 925 can be performed even more effectively. Also, the cooling fan is brought closer to the electro-optical device, so the height-wise dimensions of the projector 1 can be reduced, and reduction in size and thickness of the projector 1 can be realized.

Further, the air intake 240 is formed as a light shielding structure 305, so light can be prevented from leaking from the air intake 240, and visual recognition of the image by the observers behind the apparatus 1 can be improved. The light shielding structure 305 is formed in a louver-like configuration, so the light shielding structure 305 alone performs prevention of light leaking and introduction of cooling air, and thus the size of the projector 1 can be reduced without increasing the number of parts for the projector 1.

B. Second Embodiment

Next, a second embodiment according to the present invention will be described with reference to the drawings. Incidentally, components which are the same as or equivalent to those in he above first embodiment will be denoted with the same reference numerals, and description thereof will be omitted or simplified.

(1) Internal Structure of the Apparatus

While the first embodiment involves providing one exhaust fan 16 near the exhaust 160, the second embodiment provides two near the exhaust 160.

Figure 10:
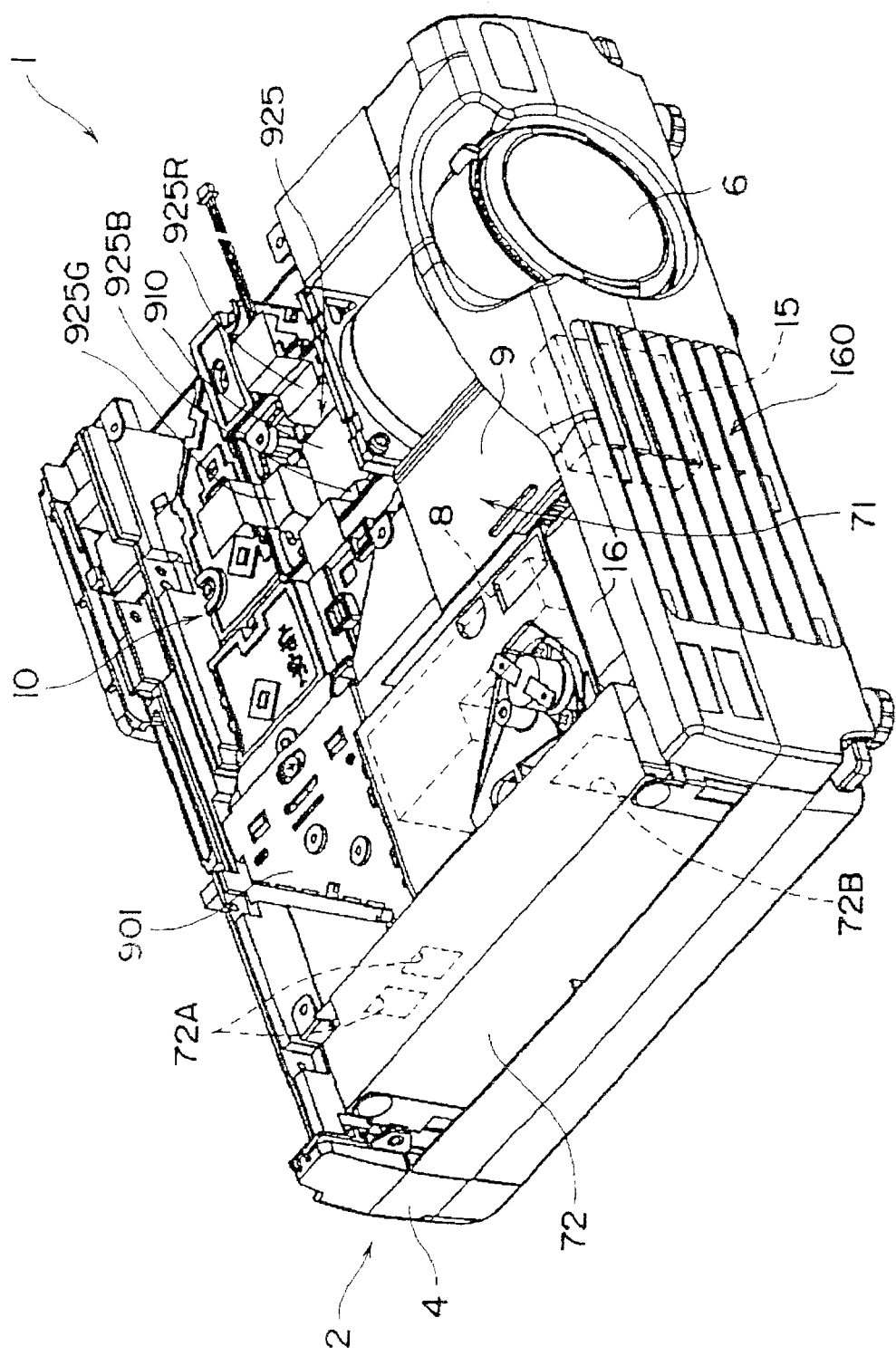
FIG. 10 is a perspective view illustrating the internal structure a projector according to a second embodiment of the present invention.

In more detail, as shown in FIG. 10, a projection lens 6 assembled in a planar U-shaped form having a recession 71 and upper and lower light guides 901 and 902 which are the optical parts housing (FIG. 2) are positioned within the apparatus 1 such that the recession 71 faces the front side of the exterior case 2. Provided to this recession 71 is an electric power source unit 9 for supplying electricity to the driving circuit boards, such as the driver board for driving the electro-optical device 925, and the like. Also, a rectangular-box-shaped protective cover member 72 is provided at one side of the upper light guide 901 at the other side of the electric power source unit 9. Inside this protective cover member 72 is provided a lamp driving circuit board for diving the light source lamp 181 (omitted in drawing). Also, provided to the side plane of the protective cover member 72 facing the upper light guide 901 is provided an opening 72A at the rear side of the apparatus 1 for introducing cooling air into the protective cover member 72, and an extracting opening 72B for passing connecting lines for mutual connection between the board and the light source lamp 181 is formed toward the front of the apparatus 1.

Ahead of the light source lamp unit 8, i.e., between the edge plane of the upper light guide 901 and the exhaust 160, is provided an exhaust fan 16 which is a device fan. Also, ahead of the electric power source unit 9, i.e., between the edge plane of the electric power source unit 9 and the exhaust 160, is provided an electric power source fan 15. The exhaust fan 16 is for discharging air which has been taken inside with the cooling fan 17 and has cooled the inside of the apparatus 1, out from the apparatus 1, and the electric power source fan 15 is dedicated to the electric power source unit 9, for independently exhausting air which has been heated by the electric power source unit 9. The exhaust fan 16 and the electric power source fan 15 are positioned side by side. Now, the width dimensions of the exhaust duct 160 are greater than the width dimensions from one side plane of the exhaust fan 16 to one side plane of the electric power source fan 15.

Also, a thermo-sensor which is a temperature detecting device is provided near the electric power source unit 9 (omitted in drawing). The thermo-sensor includes a thermistor for detecting the temperature of the heated air near the electric power source unit 9. This thermo-sensor is arranged to output temperature detecting signals to the main board (omitted in the drawing). The main board controls the voltage supplied to the electric power source fan 15 by the signals from the thermo-sensor, thus controlling the number of revolutions of the electric power source fan 15. In other words, the electric power source fan 15 is independently controlled by the temperature detected by this thermo-sensor.

That is, in the event that the thermo-sensor detects that the temperature of the electric power source unit 9 is high, the controlling operation of the main board raises the number of revolutions of the electric power source fan 15, so that the air heated by the electric power source unit 9 is rapidly exhausted from the apparatus 1. Conversely, in the event that the thermo-sensor detects that the temperature of the electric power source unit 9 is low, the controlling operation of the main board lowers the number of revolutions of the electric power source fan 15, so that the air heated by the electric power source unit 9 is slowly exhausted from the apparatus 1. Incidentally, the reference temperature serving as a reference for high and low for the detected temperature should be determined as appropriate based on results obtained by experimentation, and the like.

Now, in the present embodiment, configurations other than those described above, e.g., the configuration of the optical system, and the like, are the same as the above-described first embodiment, and thus description thereof will be omitted.

Next, the flow path of air within such a projector 1 will be described.

Figure 11:
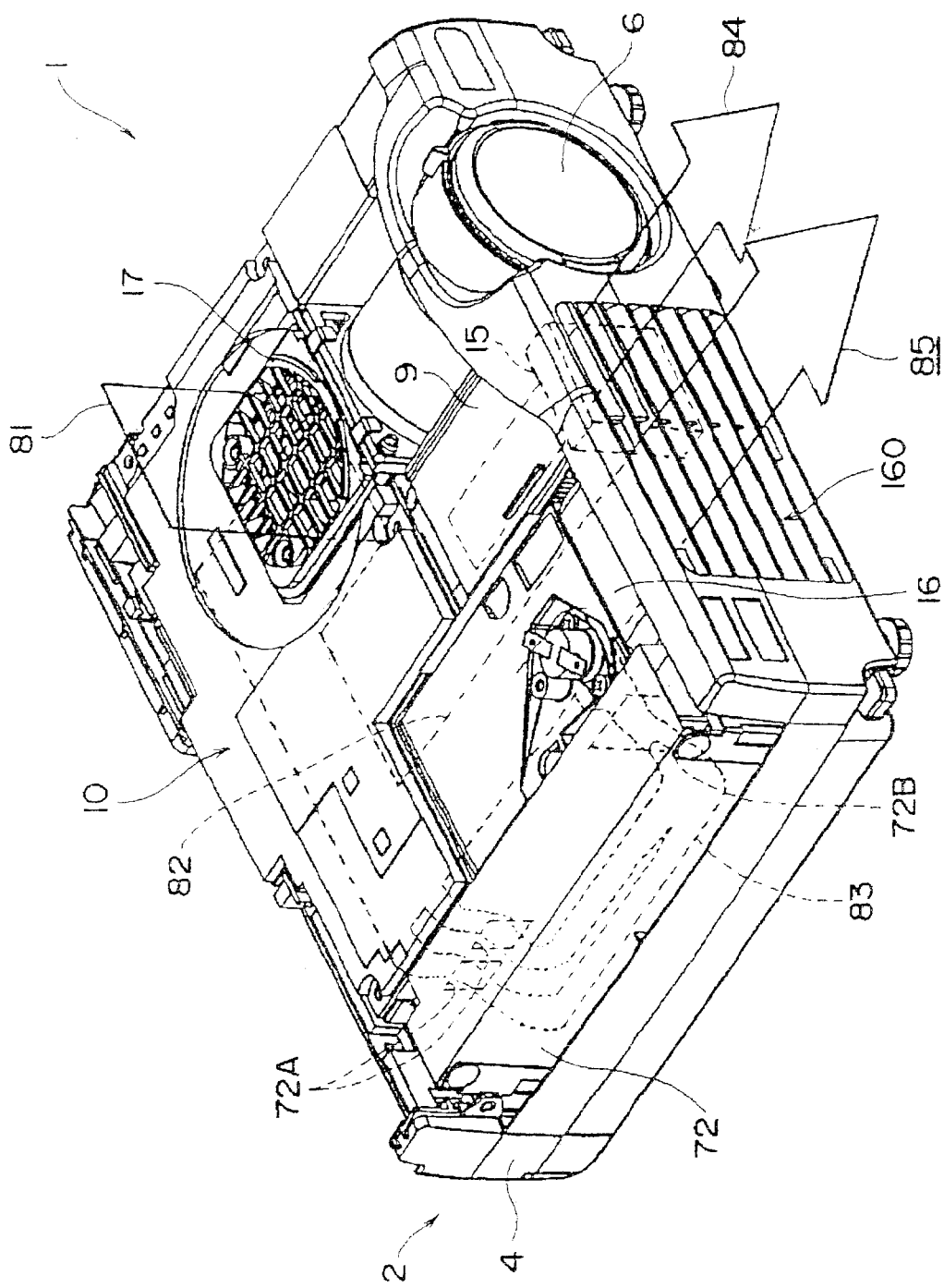
FIG. 11 is a perspective view illustrating the air flow channel within the projector in the aforementioned embodiment.

As schematically indicated by arrows in FIG. 11, the projector 1 primarily has a cooling air intake flow path 81, a device exhaust flow path 85, and an electric power source unit exhaust flow path 84 formed. It should be noted though, that the air passing through the flow paths 81, 84, and 85 does not precisely follow the arrows in the Figure, but winds through the gaps between the components and is sucked in and exhausted out more or less as shown by the arrows.

The cooling air intake flow path 81 is a flow path for cooling air sucked into the apparatus 1 from the air intake 240 by the cooling fan 17 positioned between the projecting lens 6 and upper light guide 901, and lower light guide 902. This cooling air is exhausted out of the apparatus 1 by the exhaust fan 16 having passed through the device exhaust flow path 85 following cooling the electro-optical device 925.

The device exhaust flow path 85 includes a first device exhaust flow path 82 which is formed between the lower plane of the lower light guide 902 and the inner lower plane of the exterior case 2, and a second device exhaust flow path 83 which is formed within the protective cover member 72. The first device exhaust flow path 82 is the first flow path for the cooling air which has cooled the electro-optical device 925, and passes below the lower light guide 902 and the light source lamp unit 8, and is exhausted out from the apparatus 1, from the exhaust 160, by the exhaust fan 16. Thus, the optical unit 10 provided above the lower light guide 902, the light source lamp unit 8, and the like, can be efficiently cooled. The second device exhaust flow path 83 is the second flow path for the cooling air which has cooled the electro-optical device 925, and a portion of the cooling air from the first device exhaust flow path 82 enters the protective cover member 72 from the opening 72A, passes out of the protective cover member 72 from the extracting opening 72B, and is exhausted out from the apparatus 1, from the exhaust 160, by the exhaust fan 16.

The electric power source unit exhaust flow path 84 is a flow path for air heated by the electric power source unit 9, and this heated air is exhausted out from the apparatus 1, from the exhaust 160, by the electric power source fan 15.

(2) Advantages of the Second Embodiment

According to the present second embodiment as described above, in addition to the advantages of the first embodiment being obtained, the following advantages can be obtained.

That is, an exhaust 160 for externally exhausting air within the apparatus 1 is provided to the front plane of the exterior case 2, so air taken inside the apparatus 1 by the cooling fan 17 can be exhausted forwards from the apparatus 1. Accordingly, the exhausted air does not blow on observers behind or beside the apparatus 1, so the observers do not feel discomfort.

Also, the exhaust 160 is provided to the front plane of the exterior case 2, so light leaking from the exhaust 160 is not recognized by the observers behind or beside the apparatus 1, and visual recognition of the image by the observers can be improved.

Further, an exhaust fan 16 and a electric power source fan 15 dedicated to the electric power source unit 9 are provided to the exhaust 160, so air heated by the electric power source unit 9 can be aggressively exhausted, rise in temperature of the electric power source unit 9 can be suppressed, and stabilization of the electric power source unit 9 can be easily realized.

Also, a thermo-sensor is provided near the electric power source unit 9, such that the electric power source fan 15 is independently controlled according to the temperature detected by the thermo-sensor, so rapid increase in temperature due to supplying electric power to the driving circuit board, and the like, can be easily prevented, and heating prevention of the electric power source unit 9 can be easily realized.

Further, a cooling air intake flow path 81, a device exhaust flow path 85 made up of a first device exhaust flow path 82 and a second device exhaust flow path 83, and a electric power source unit exhaust flow path 84, are provided within the apparatus 1, so the inside of the protective cover member 72 can be cooled as well, and cooling within the projector 1 can be performed even more efficiently.

Also, suction and exhaust flow paths are formed, so circulation of air is performed in an efficient manner, and the cooling efficiency of the electro-optical device 925 can be improved even further. Also, the cooling air intake flow path 81 and the exhaust flow paths 84 and 85 are thus formed, so the internal structure of the projector 1 can be simplified, and the cooling air flowing below the lower light guide 902 relates to the optical parts, such as lenses, mirrors, etc., stored within the upper light guide 901 and lower light guide 902 can also be easily cooled.

C. Third Embodiment

Next, a third embodiment according to the present invention will be described with reference to the drawings. Incidentally, components which are the same as or equivalent to those in he above first and second embodiments will be denoted with the same reference numerals, and description thereof will be omitted or simplified.

(1) Internal Structure of the Apparatus

With the third embodiment, a rectifying plate 91 is provided between the upper light guide 901 and prism 910 in the first embodiment.

Figure 12:
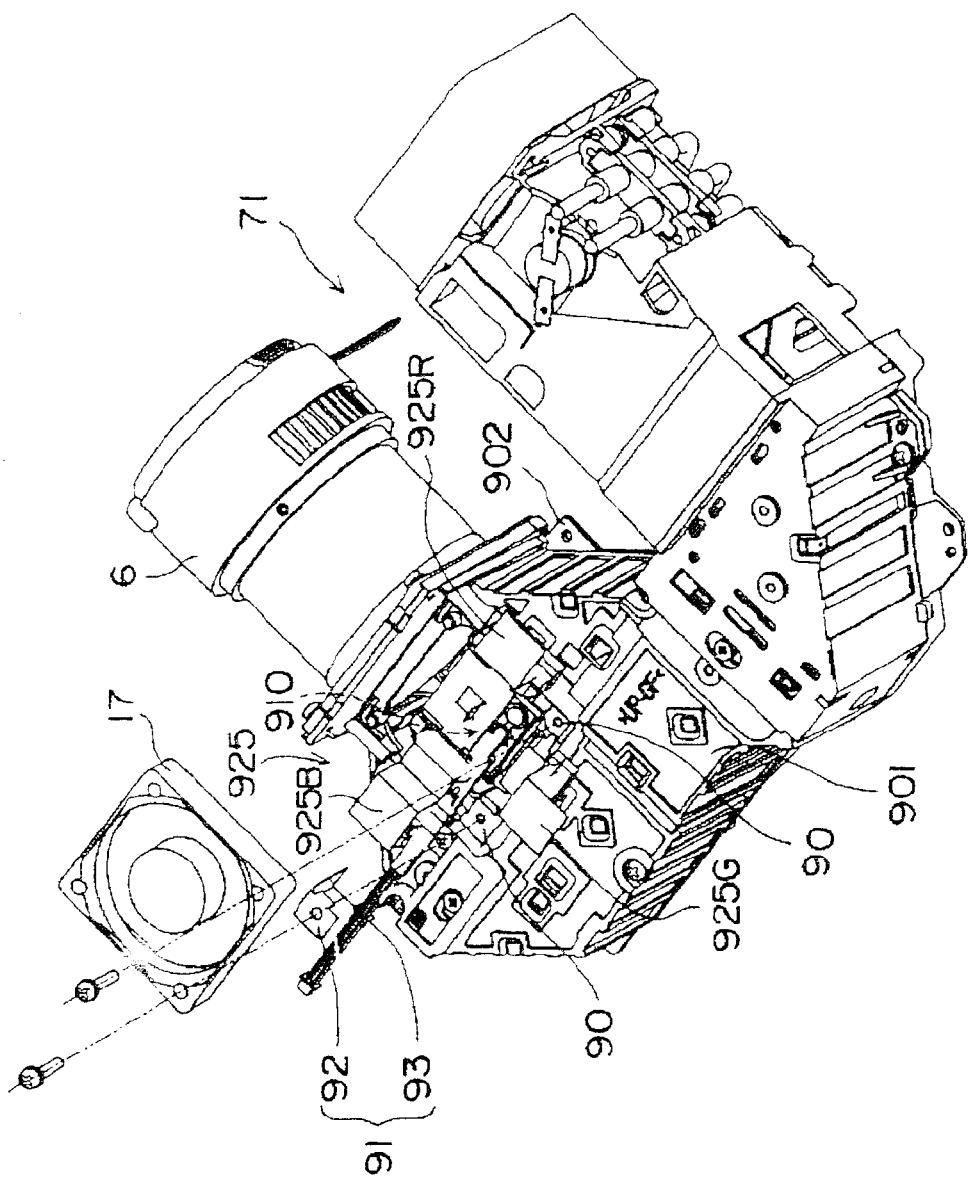
FIG. 12 is a disassembled perspective view illustrating the internal structure a projector according to a third embodiment of the present invention.

As shown in FIG. 12, fan attaching parts 90 for screwing the cooling fan 17 to are provided to two corners of the upper light guide 901 which is formed so as to surround the light modulating devices 925R, 925G, and 925B, attached to the side of the cross-dichroic prism 910. Of these fan attaching parts 90, a rectifying plate 91 for guiding the cooling air from the cooling fan 17 to the liquid crystal panel 925B is provided to the fan attaching part 90 at the side of the liquid crystal panel 925B.

Figure 13:
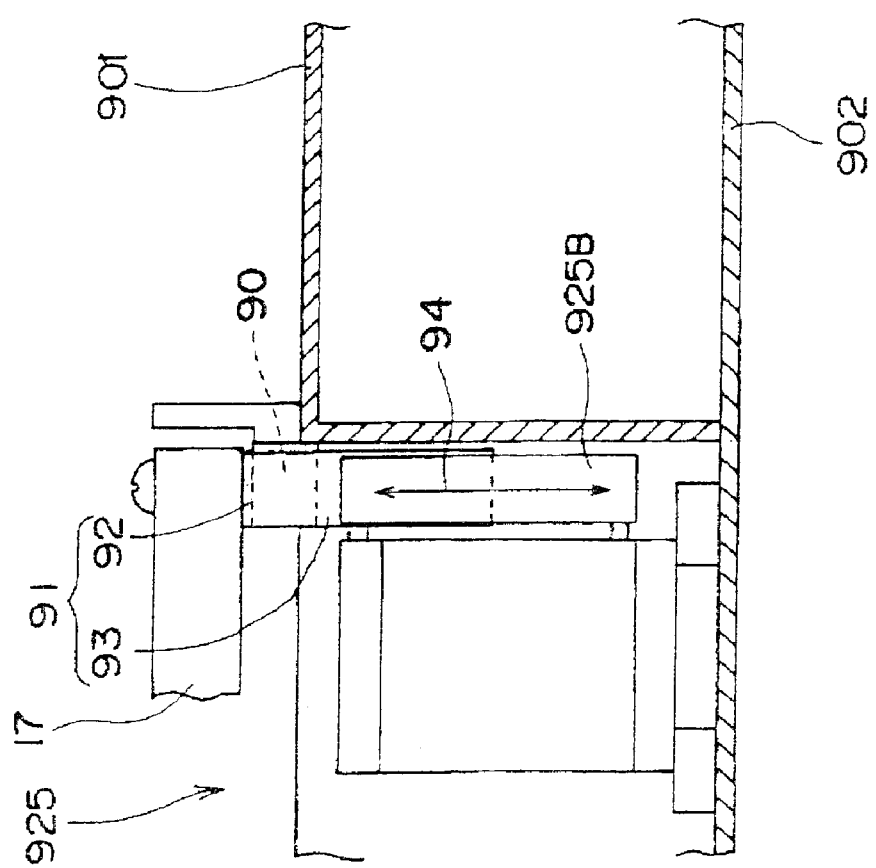
FIG. 13 is a cross-sectional view illustrating the principal portions of the aforementioned embodiment.

As shown in FIG. 13, the rectifying plate 91 is formed in a cross-sectional L-shaped form, having an attaching piece 92 attached to the fan attaching part 90, and an extending piece 93 perpendicularly extending from the edge portion of this attaching piece 92 toward the electro-optical device 925 and lower light guide 902. Then, the tip of the extending piece 93 extends lower than the upper edge of the image forming area 94 of the liquid crystal panel 925B. The image forming area 94 relates to the area at the center of the liquid crystal panel 925B used for forming images. Light is concentrated at this area, and particularly easily overheats. Also, in the event that a material which easily changes modulation properties by heat, such as liquid crystal is used, temperature rising in the image forming area may cause deterioration in the image quality. However, according to the present embodiment, the tip of the extending piece 93 of the rectifying plate is extended lower than the upper edge of the image forming area 94 of the liquid crystal panel 925B, thus enabling cooling air from the cooling fan 17 to be directly blown onto the image forming area 94, and consequently, such problems can be reduced. Further, with the present embodiment, the rectifying plate 91 is attached to the fan attaching part 90 at the side of the liquid crystal panel 925B, and the surface of the extending piece 93 is directed toward the liquid crystal panel 925B, such that great amounts of cooling air are blown onto the image forming area 94 of the liquid crystal panel 925B. Blue light has greater energy than the other color lights, and thus easily overheats, but with the present embodiment, the cooling air which flows downward from the cooling fan 17 while rotating strikes against the head plane 64, reflects and cools the liquid crystal panel 925B, and further reflects off of the rectifying plate 91, and is directly blown against the image forming area 94, and thus the image forming area 94 for blue light can be efficiently cooled.

(2) Advantages of the Third Embodiment

According to the present third embodiment as described above, in addition to the advantages of the first and second embodiments being obtained, the following advantages can be obtained.

That is, a rectifying plate 91 is provided between the upper light guide 901 and the prism 910, so cooling air from the cooling fan 17 can be guided to the liquid crystal panel with the rectifying plate 91, circulation of air flowing through the gap between the upper light guide 901 and the prism 910 is performed efficiently, and the cooling effectiveness of the electro-optical device 925 and be even further improved.

Also, the rectifying plate 91 is attached to the upper light guide 901, so there is no need to have a separate structure within the apparatus to support the rectifying plate 91, and the structure can be simplified. Accordingly, ease of the task of attaching the rectifying plate 91 is facilitated, further facilitating ease of the task of assembling the projector 1.

Further, the rectifying plate 91 is attached between the fan attaching part 90 and the cooling fan 17, so the rectifying plate 91 can be attached to the upper light guide 901 at the same time as the cooling fan 17. Also, the cooling air introduced from the cooling fan 17 into the apparatus can be effectively guided and blown onto the liquid crystal panel 925B. Accordingly, the cooling efficiency of the liquid crystal panel 925B can be improved even further.

Also, the tip of the extending piece 93 is extended lower than the upper edge of the image forming area 94, thus enabling cooling air to strike against the extending piece 93 and be directly blown onto the image forming area 94. The cooling efficiency of the liquid crystal panel 925B can be improved even further from this perspective, as well.

Further, the rectifying plate 91 is positioned near the liquid crystal panel 925B, so great amounts of cooling air can be blown onto the liquid crystal panel 925B which easily overheats, thereby suppressing rapid temperature rising of the liquid crystal panel 925B.

D. Variations of the Embodiments

It should be noted that the present invention is not restricted to the above-described embodiments, but rather encompasses variations, such as described next.

For example, with the first embodiment, the plate-shaped members 306 are positioned inclining downwards toward the rear side of the apparatus 1, but the present invention is not restricted to such, and these may be positioned inclining downwards toward the front side of the apparatus 1.

Also, with the first embodiment, the light shielding structure 305 is formed with the plate-shaped members 306 arranged in a louver-like configuration, but the present invention is not restricted to such, and the form and configuration thereof may be determined as appropriate for that embodiment as long as the structure prevents light from leaking.

Further, with the first embodiment, the light shielding structure 305 is formed to the air intake 240, but the present invention is not restricted to such, and the light shielding structure 305 may be provided so as to cover the filter exchanging lid 241 to which the air intake 240 is formed, or may be provided to the inner side of the filter exchanging lid 241, just as long as it is provided above the cooling fan 17 and prevents light from leaking to the outside from the air intake 240.

Also, with the first embodiment, the number of lenses notched at the upper edge side was the one lens 61A positioned closest to the base edge side as to the direction of projection, but the present invention is not restricted to such, and may be multiple lenses. At this time, the number of lenses notched at the upper edge side is preferably set according to the position of parts within the apparatus 1, the number of parts, and the desired size of the projector 1, and is set to a level which does not affect the optical image from the liquid crystal panels 925R, 925G, and 925B.

Further, with the second embodiment, the air flow paths are made up of the cooling air intake flow path 81, the device exhaust flow path 85, and the electric power source unit exhaust flow path 84, these three, but the present invention is not restricted to such, and the number of flow paths may be four, or may be five, with the number of flow paths and the configuration thereof being determined as appropriate according to the positioning of the parts.

Also, with the second embodiment, the electric power source fan 15 is controlled by a thermo-sensor provided near the electric power source unit 9, but the present invention is not restricted to such, and heated air may be periodically exhausted out from the apparatus 1 with a timer, or the like, for example.

Further, with the second embodiment, an electric power source fan 15 which independently exhausts air heated by the electric power source unit 9 is provided besides the exhaust fan 16, but the present invention is not restricted to such, and any arrangement is suitable as long as air heated by the electric power source unit 9 can be aggressively exhausted, rising of the temperature of the electric power source unit 9 can be suppressed, and the electric power source unit 9 can be easily stabilized.

Also, with the third embodiment, the tip of the extending piece 93 is positioned so as to be extended lower than the upper edge of the image forming area 94, but the present invention is not restricted to such, and may be positioned above the upper edge of the image forming area 94 as long as the form of the extending piece allows cooling air to blow against the image forming area 94.

Further, with the third embodiment, the rectifying plate 91 is attached to the fan attaching part 90, but the present invention is not restricted to such, and a dedicated attaching piece for attaching the rectifying plate may be provided to the upper light guide 901, for example, with the rectifying plate attached thereto.

Further, with the third embodiment, the rectifying plate 91 is attached to the light guide, but the present invention is not restricted to such, and may be attached to the head plate 64, for example.

Also, with the above embodiment, a rectifying plate is provided only for the liquid crystal panel 925B, but the present invention is not restricted to such, and may also be provided to the liquid crystal panel 925R and liquid crystal panel 925G, within the range of not obstructing the flow of cooling air between the upper light guide 901 and prism 910.

Also, with the above embodiments, the exhaust 160 is provided to the front of the external case 2, but the present invention is not restricted to such, and may be provided to the side of the external case 2, for example.

With the above embodiments, the electro-optical device 925 includes TFT-driven liquid crystal panels 925R, 925G, and 925B, but the present invention is not restricted to such, and the present invention may be employed with projectors provided with light modulating devices made of other driving methods.

Also, with the above embodiments, the electro-optical device 925 includes the three liquid crystal panels 925R, 925G, and 925B, but the present invention is not restricted to such, and the present invention may be employed with light modulating devices including one or two liquid crystal panels.

Also, with the above embodiments, the panels making up the electro-optical device 925 are liquid crystal panels, but items other than liquid crystal panels may be used, and the present invention may be employed with projectors including light modulating devices made up of devices for forming images by plasma light emission, or devices using micromirrors.

Further, with the above embodiments, the electro-optical device 925 is of a type wherein the light fluxes R, G, and B are transmitted and modulated, but the present invention is not restricted to such, and the present invention may be employed with projectors reflection type including light modulating devices wherein incident light is modulated while being reflected and thus emitted.

Other specific structures, forms, and the like, for carrying out the present invention, may be replaced with other structures, and the like, within the range of achieving the aspects of the present invention.

What is claimed is:

1. A projector, comprising:

an optical parts housing that stores optical parts;

an electro-optical device that forms optical images according to image information, the electro-optical device disposed between an upper plane that extends from an upper side of the optical parts housing and a lower plane that extends from a bottom side of the optical parts housing;

a projection lens that enlarges a projection of the images formed with the electro-optical device, the projecting lens placed on an opposite side of the electro-optical device from the optical parts housing;

an exterior case that covers a main unit containing the electro-optical device, an air intake opening for intake of external air as cooling air being formed at the upper plane of the exterior case; and a cooling fan that introduces the cooling air from the air intake opening to cool the electro-optical device being provided above the electro-optical device, the cooling fan disposed below the upper plane.

2. The projector according to claim 1, further comprising an exhaust opening for exhausting air inside of the projector to outside the projector, the exhaust opening being provided on the front plane of the exterior case.

3. The projector according to claim 2, the projecting lens and the optical parts housing being combined and formed in a planar U-shape having a recessed portion, the recessed portion facing the front side of the exterior case, an electric power source unit that supplies electric power to driving circuit boards and drives the electro-optical device, being positioned at the recessed portion;

a device fan that exhausts air which has been taken in with the cooling fan for cooling internal parts of the projector, to outside of the projector; and an electric power source fan that independently exhausts air which has been heated by the electric power source unit, the device fan and the electric power source fan being provided at the exhaust opening.

4. The projector according to claim 3, further comprising a temperature detecting device that detects the temperature of the cooling air near the electric power source unit, being provided near the electric power source unit, the electric power source fan being independently controlled by temperature detected by the temperature detecting device.

5. The projector according to claim 3, further comprising a lamp driving circuit board that drives a lamp provided at the side of the planar U-shape that includes the projecting lens and the optical parts housing, the lamp driving circuit board having a cooling air intake channel for introducing cooling air taken in by the cooling fan being formed between the projecting lens and the optical parts housing and covered by a protective cover member, and an exhaust channel for leading the cooling air which has been introduced from the cooling air intake channel and which has cooled the electro-optical device, to the device fan, being formed between the lower plane of the optical parts housing and the inner lower plane of the exterior case, an opening for introducing a part of the cooling air flowing through the exhaust channel being formed in the protective cover member.

6. The projector according to claim 1, the electro-optical device having a plurality of light modulation devices, a prism that synthesizes light modulated by the plurality of light modulation devices, and an optical parts housing which stores optical parts other than the projecting lenses, the light modulation devices, and the prism and is formed so as to envelop the light incidence plane of the light modulating device, a rectifying plate that introduces cooling air from the cooling fan to the light modulating devices being provided at the gap between the optical parts housing and the prism.

7. The projector according to claim 6, the rectifying plate being attached to the optical parts housing.

8. The projector according to claim 7, the optical parts housing having a fan attachment portion that fixes the cooling fan, and the rectifying plate being attached between the fan attachment portion and the cooling fan.

9. The projector according to claim 8, the rectifying plate having an attaching piece which is attached to the fan attachment portion, and an extending piece which extends from the edge portion of the attaching piece toward the light modulating devices, the tip of the extending piece being positioned lower than the cooling fan side edge of the image forming area of the light modulating devices.

10. A projector, comprising:
  an electro-optical device that forms optical images according to image information;
  a projecting lens that enlarges projection of images formed by the electro-optical device, the projecting lens having a plurality of lenses positioned following a predetermined axis, with a lens of the plurality of lenses positioned closest to the electro-optical device at least notched at the upper edge side thereof;
  an exterior case that covers a main unit containing the electro-optical device, an air intake opening for intake of external air as cooling air being formed at the upper plane of the exterior case; and
  a cooling fan that introduces the cooling air from the air intake opening to cool the electro-optical device being provided above the electro-optical device.

11. The projector according to claim 10, further comprising an exhaust opening for exhausting air inside of the projector to outside the projector, the exhaust opening being provided on the front plane of the exterior case.

12. The projector according to claim 11, further comprising:
  an optical parts housing that stores optical parts, the projecting lens and the optical parts housing being combined and formed in a planar U-shape having a recessed portion, the recessed portion facing the front side of the exterior case, an electric power source unit that supplies electric power to driving circuit boards and drives the electro-optical device, being positioned at the recessed portion;
  a device fan that exhausts air which has been taken in with the cooling fan for cooling internal parts of the projector, to outside of the projector; and
  an electric power source fan that independently exhausts air which has been heated by the electric power source unit, the device fan and the electric power source fan being provided at the exhaust opening.

13. The projector according to claim 12, further comprising a temperature detecting device that detects the temperature of the cooling air near the electric power source unit, being provided near the electric power source unit, the electric power source fan being independently controlled by temperature detected by the temperature detecting device.

14. The projector according to claim 12, further comprising a lamp driving circuit board that drives a lamp provided at the side of the planar U-shape that includes the projecting lens and the optical parts housing, the lamp driving circuit board having a cooling air intake channel for introducing cooling air taken in by the cooling fan being formed between the projecting lens and the optical parts housing and covered by a protective cover member, and an exhaust channel for leading the cooling air which has been introduced from the cooling air intake channel and which has cooled the electro-optical device, to the device fan, being formed between the lower plane of the optical parts housing and the inner lower plane of the exterior case, an opening for introducing a part of the cooling air flowing through the exhaust channel being formed in the protective cover member.

15. The projector according to claim 10, the electro-optical device having a plurality of light modulation devices, a prism that synthesizes light modulated by the plurality of light modulation devices, and an optical parts housing which stores optical parts other than the projecting lenses, the light modulation devices, and the prism, the optical parts housing being formed so as to envelop the light incidence plane of the light modulating device, the electro-optical device also having a rectifying plate that introduces cooling air from the cooling fan to the light modulating devices being provided at the gap between the optical parts housing and the prism.

16. The projector according to claim 15, the rectifying plate being attached to the optical parts housing.

17. The projector according to claim 16, the optical parts housing having a fan attachment portion that fixes the cooling fan, and the rectifying plate being attached between the fan attachment portion and the cooling fan.

18. The projector according to claim 17, the rectifying plate having an attaching piece which is attached to the fan attachment portion, and an extending piece which extends from the edge portion of the attaching piece toward the light modulating devices, the tip of the extending piece being positioned lower than the cooling fan side edge of the image forming area of the light modulating devices.

19. The projector according to claim 1, further comprising:
  a light shielding structure that prevents light from leaking from the air intake opening is provided above the cooling fan, the light shielding structure being formed in a louver-like configuration and a plurality of plate-shaped members being positioned in a parallel manner across the air intake opening so as to assume a predetermined angle with the plane of the air intake opening, the predetermined angle being such that the plate-shaped members are inclined downwards towards a rear side of the projector.

20. The projector according to claim 19, further comprising an exhaust opening for exhausting air inside of the projector to outside the projector, the exhaust opening being provided on the front plane of the exterior case.

21. The projector according to claim 20, further comprising:
  the projecting lens and the optical parts housing being combined and formed in a planar U-shaped having a recessed portion, the recessed portion facing the front side of the exterior case, an electric power source unit that supplies electric power to driving circuit boards and drives the electro-optical device, being positioned at the recessed portion;

a device fan that exhausts air which has been taken in with the cooling fan for cooling internal parts of the projector, to outside of the projector; and an electric power source fan that independently exhausts air which has been heated by the electric power source unit, the device fan and the elctric power source fan being provided at the exhaust opening.

22. The projector according to claim 21, further comprising a temperature detecting device that detects the temperature of the cooling air near the electric power source unit, being provided near the electric power source unit, the electric power source fan being independently controlled by temperature detected by the temperature detecting device.

23. The projector according to claim 21, further comprising a lamp driving circuit board that drives a lamp provided at the side of the planar U-shape that includes the projecting lens and the optical parts housing, the lamp driving circuit board having a cooling air intake channel for introducing cooling air taken in by the cooling fan being formed between the projecting lens and the optical parts housing and covered by a protective cover member, and an exhaust channel for leading the cooling air which has been introduced from the cooling air intake channel and which has cooled the electro-optical device, to the device fan, being formed between the lower plane of the optical parts housing and the inner lower plane of the exterior case, an opening for introducing a part of the cooling air flowing through the exhaust channel being formed in the protective cover member.

24. The projector according to claim 19, the electro-optical device having a plurality of light modulation devices, a prism that synthesizes light modulated by the plurality of light modulation devices, and an optical parts housing which stores optical parts other than the projecting lenses, the light modulation devices, and the prism and is formed so as to envelop the light incidence plane of the light modulating device, a rectifying plate that introduces cooling air from the cooling fan to the light modulating devices being provided at the gap between the optical parts housing and the prism.

25. The projector according to claim 24, the rectifying plate being attached to the optical parts housing.

26. The projector according to claim 25, the optical parts housing having a fan attachment portion that fixes the cooling fan, and the rectifying plate being attached between the fan attachment portion and the cooling fan.

27. The projector according to claim 26, the rectifying plate having an attaching piece which is attached to the fan attachment portion, and an extending piece which extends from the edge portion of the attaching piece toward the light modulating devices, the tip of the extending piece being positioned lower than the cooling fan side edge of the image forming area of the light modulating devices.

* * * * *